United States Patent
Weimer et al.

(10) Patent No.: US 9,320,195 B2
(45) Date of Patent: Apr. 26, 2016

(54) TRIMMER HEAD FOR A TRIMMER

(71) Applicant: Andreas Stihl AG & Co. KG, Waiblingen (DE)

(72) Inventors: Ina Weimer, Stuttgart (DE); Katharina Keller, Berglen (DE); Thomas Neumaier, Winnenden (DE); Thomas Stark, Waiblingen (DE); Jürgen Häberlein, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 100 days.

(21) Appl. No.: 14/196,048

(22) Filed: Mar. 4, 2014

(65) Prior Publication Data
US 2014/0250699 A1 Sep. 11, 2014

(30) Foreign Application Priority Data
Mar. 6, 2013 (DE) .......................... 10 2013 003 856

(51) Int. Cl.
*B26B 7/00* (2006.01)
*A01D 34/416* (2006.01)

(52) U.S. Cl.
CPC .......... *A01D 34/416* (2013.01); *A01D 34/4166* (2013.01)

(58) Field of Classification Search
USPC ............ 30/276, 347, 334; 83/698.41; 56/12.5
See application file for complete search history.

(56) References Cited

U.S. PATENT DOCUMENTS

| 4,335,510 | A * | 6/1982 | Close et al. ...................... 30/276 |
| 8,069,758 | B2 * | 12/2011 | Zhang et al. ...................... 83/13 |
| 2004/0128840 | A1 * | 7/2004 | Proulx et al. ...................... 30/276 |
| 2005/0229402 | A1 * | 10/2005 | Iacona ............................ 30/276 |
| 2006/0026846 | A1 * | 2/2006 | Alliss .............................. 30/276 |
| 2006/0053635 | A1 * | 3/2006 | Legrand ........................... 30/276 |
| 2006/0090350 | A1 * | 5/2006 | Legrand ........................... 30/276 |
| 2006/0242842 | A1 * | 11/2006 | Legrand ........................... 30/276 |
| 2013/0205596 | A1 * | 8/2013 | Pellenc, Roger ............... 30/122 |
| 2013/0283623 | A1 | 10/2013 | Pellenc |

FOREIGN PATENT DOCUMENTS

| EP | 0 824 854 B1 | 2/1998 |
| EP | 1421840 A1 | 5/2004 |
| EP | 1 586 231 B1 | 10/2005 |

* cited by examiner

*Primary Examiner* — Omar Flores Sanchez
(74) *Attorney, Agent, or Firm* — Gudrun E. Huckett

(57) ABSTRACT

A trimmer head for a trimmer has a base member having a trimmer line opening. A clamping device arranged in the base member clamps a trimmer line that defines a cutting plane when rotated. The clamping member of the clamping device is rotatably disposed on a pivot bolt having a pivot axis positioned in a plane that is parallel to the cutting plane. The clamping member is spring-loaded by a clamping spring into a clamping position. The trimmer line is secured in the clamping position between a clamping surface and the clamping member. A centrifugal force acting on the trimmer line loads the clamping member in the clamping position. A U-shaped bracket has bracket legs connected by a stay. The clamping member is positioned between the bracket legs. The pivot bolt is supported on the bracket leg ends. The stay of the U-shaped bracket forms the clamping surface.

20 Claims, 19 Drawing Sheets

TRIMMER HEAD FOR A TRIMMER

BACKGROUND OF THE INVENTION

The invention relates to a trimmer head for a trimmer comprising an elongate trimmer line that is secured by clamping in the base member of the trimmer head and projects through a trimmer line opening in the base member to the exterior and, upon rotation of the trimmer head, defines a cutting plane. The trimmer head further comprises a clamping device arranged in the base member of the trimmer head for clamping the trimmer line. The clamping device comprises a clamping member that is movable about a pivot bolt, wherein the pivot axis of the pivot bolt is positioned in a plane that is approximately parallel to the cutting plane and wherein the clamping member is spring-loaded by a clamping spring into a clamping position. In the clamping position of the clamping member, the trimmer line is secured between a clamping surface and the clamping member. A centrifugal force which is acting at the trimmer line loads the clamping member in the clamping position in its clamping direction. The clamping surface and the support of the pivot bolt are formed on an a common component.

EP 0 824 854 B1 discloses a trimmer head in which the trimmer line is secured by means of a spring-loaded clamping member in the trimmer line opening. The clamping member is pivotable about a pivot axis that is positioned parallel to the axis of rotation; the centrifugal force that is acting on the trimmer line and the clamping member increases the clamping action exerted by the clamping member.

EP 1 586 234 B1 discloses a trimmer head of the aforementioned kind in which the clamping member, the pivot bolt of the clamping member, and an outlet sleeve for the trimmer line are formed together as a common cylindrical component. The pivot bolt is positioned in a plane that is approximately parallel to the cutting plane of the trimmer line, wherein the clamping member is spring-loaded by a clamping spring into its clamping position. In the clamping position of the clamping member, the trimmer line is secured between a clamping surface provided at the housing and the clamping member. The centrifugal force acting on the trimmer line loads the clamping member positioned in the clamping position in the clamping direction, i.e., the clamping action is thereby enhanced. The clamping surface and the support of the pivot axis of the clamping member are formed together in the common cylindrical component which can move in the base member of the trimmer head about an axis that is parallel to the axis of rotation.

The configuration of the clamping device is complex and the rotational support of the clamping device in the base member of the trimmer head is susceptible to failure.

SUMMARY OF THE INVENTION

It is an object of the present invention to provide a trimmer head for a trimmer of the aforementioned kind with a clamping device in such a way that, while a simple configuration is provided, a safe clamping action of the trimmer line is ensured even for an extended operating time.

In accordance with the present invention, this is achieved in that the common component is a U-shaped bracket, that the clamping member is positioned between the bracket legs of the bracket, and the pivot bolt of the clamping member is supported at the ends of the bracket legs, wherein the clamping surface for the trimmer line is formed on the stay that is connecting the bracket legs of the U-shaped bracket.

The clamping member, the clamping spring, and the pivot bolt are formed on a common component that is configured as a U-shaped bracket. The clamping member is positioned between the legs of the bracket and the pivot bolt is supported at the ends of the legs of the U-shaped bracket. At the same time, on the stay of the U-shaped bracket that connects first ends of the bracket legs the clamping surface for the trimmer line is formed so that the clamping device can be preassembled as an independent modular unit and, upon final assembly of the trimmer head, must only be inserted into a receiving pocket of the base member that is comprised of plastic material. With a simple configuration and simple assembly, a clamping device of a trimmer head is provided which, even for an extended operating time, ensures a reliable clamping action of the trimmer line wherein all clamping forces that are acting in operation on the clamping device are absorbed by the U-shaped bracket.

In a constructively simple way, the pivot bolt is inserted radially into slots of the second ends of the bracket legs and is secured by the clamping spring in its mounted position in the U-shaped bracket. For this purpose, expediently the clamping spring is embodied as a leg spring or spiral spring that is positioned on the pivot axis wherein the first spring leg of the spring engages the clamping member to spring-load it and the second spring leg of the spring is secured in a locking recess that is formed on a bracket leg end of the U-shaped bracket. This locking recess is expediently formed in the end face of the free bracket leg end. For fixation of the pivot bolt one spring end of the clamping spring must only be lifted onto the free end face of the bracket leg end. When inserting the pivot bolt into the slots of the bracket leg ends of the U-shaped bracket, the spring end resting on the end face of the bracket leg end is displaced until it engages the locking recess of the end face. In this way, the pivot bolt is captively secured on the bracket by means of the locked spring leg of the clamping spring.

In order to limit the rotational movement of the clamping member which is possible by the spring action, on the bracket a stop is formed which is expediently provided as a bent tab which is an integrally formed on a bracket leg of the bracket. The clamping spring loads the clamping member in the rotational direction toward the stop. Without inserted trimmer line, the clamping member is resting on the stop under the action of the clamping spring. The clamping spring is advantageously a leg spring or spiral spring that is secured and supported together with the clamping member on the pivot bolt.

In a first embodiment of the invention, the clamping spring is arranged between the bracket legs of the bracket. In this way, it is in a protected position between the bracket legs. A simple arrangement is provided when the clamping member is positioned off-center between the bracket legs so that expediently on one side of the clamping member sufficient space for a clamping spring is available. In the volume of the free space that is provided between the clamping member and a bracket leg of the bracket, a filling body is advantageously inserted in order to counteract a deflection of the trimmer line into this free space. An accidental insertion of the trimmer line into the free space of the U-shaped bracket can thus be prevented.

In a simple embodiment, a wall element of the base member of the trimmer head projects into the U-shaped bracket of the clamping device so that precisely this free space between the clamping member and the bracket leg is at least partially covered. In this way, it is prevented that the trimmer line to be inserted into the clamping device is deflected into the free space of the bracket.

In a special embodiment, into the free space between the clamping member and a bracket leg of the bracket an insertion part may be inserted that in particular fills out the space. The insertion part is designed in accordance with the specific requirements and the volume of the free space is completely or partially filled out by it. The insertion part is preferably a three-dimensionally designed sheet metal part which preferably is penetrated by the pivot bolt and, in particular, can be secured with an anti-rotation action on the bracket. The anti-rotation action is expediently formed as an integral (monolithic) securing flange which is bent out of the plane of the insertion part and preferably engages a slot of the bracket leg of the bracket that receives the pivot bolt.

The insertion part is designed such that it has a first section that is resting within the free space approximately flat on the bracket leg of the bracket and has a second section that is positioned tightly next to the clamping member. The second section that is expediently flat has just enough lateral distance to the clamping member that the latter can freely rotate about its pivot axis without being impaired by the insertion part.

In order to minimize a free space within the bracket or to even avoid it entirely, in a further embodiment of the invention it is provided that the pivot bolt projects with an end section past a bracket leg of the bracket wherein the clamping spring is arranged on the end section of the pivot bolt that is outside of the bracket. The bracket legs of the bracket have at both sides of the clamping member just enough lateral distance to the clamping member that the latter can rotate freely about its pivot axis without impairment.

Easy insertion of the trimmer line into the clamping device is ensured when the clamping surface of the bracket is positioned at the same level as the lower edge of the trimmer line opening. The trimmer line opening is expediently formed by an outlet sleeve that is secured in the circumferential wall of the base member. In order to secure the outlet sleeve relative to the acting centrifugal forces, it is provided that the outlet sleeve engages with a rim a receptacle of the base member and in this way positively interlocks with the base member in the radial direction of action of the centrifugal force.

Expediently, at least one lateral surface of the clamping member is provided with a countersunk hole in order to reduce the total weight of the clamping member and to move its center of gravity as close as possible to the pivot axis. The countersunk hole is expediently designed as a bore, in particular, a penetrating bore, wherein its bore axis is preferably positioned approximately parallel to the pivot bolt.

The U-shaped bracket of the clamping device absorbs all clamping forces and spring forces so that the base member is substantially free of any mechanical load about the clamping device. Expediently, the bracket is made of metal and is in particular made by bending a metal strip to the appropriate shape.

DESCRIPTION OF THE PREFERRED EMBODIMENTS

Figure 1:
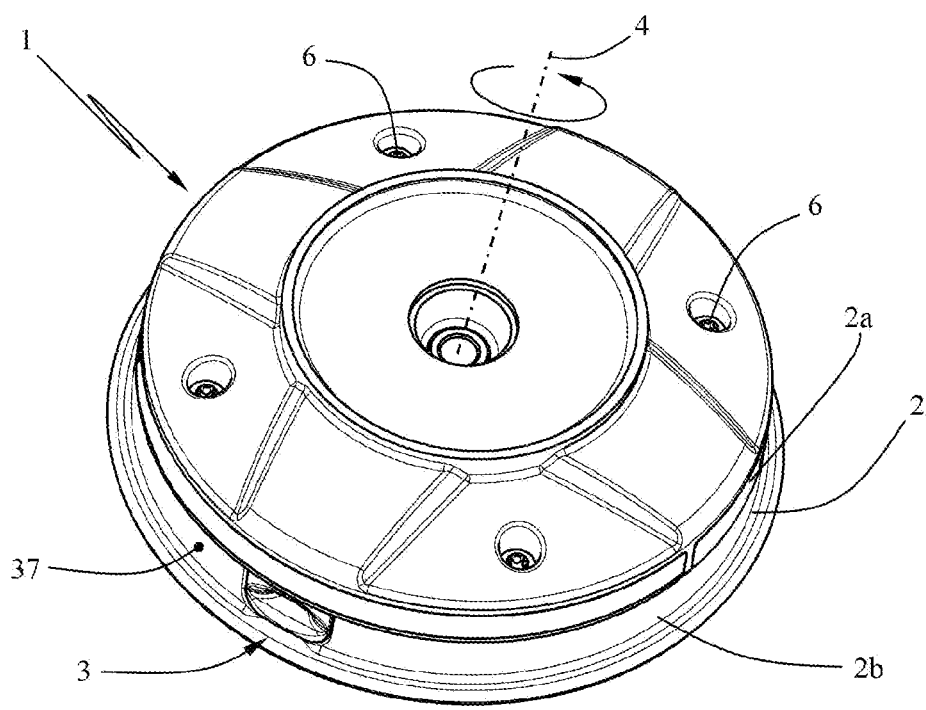
FIG. 1 is a perspective view of a base member of a trimmer head.
Figure 2:
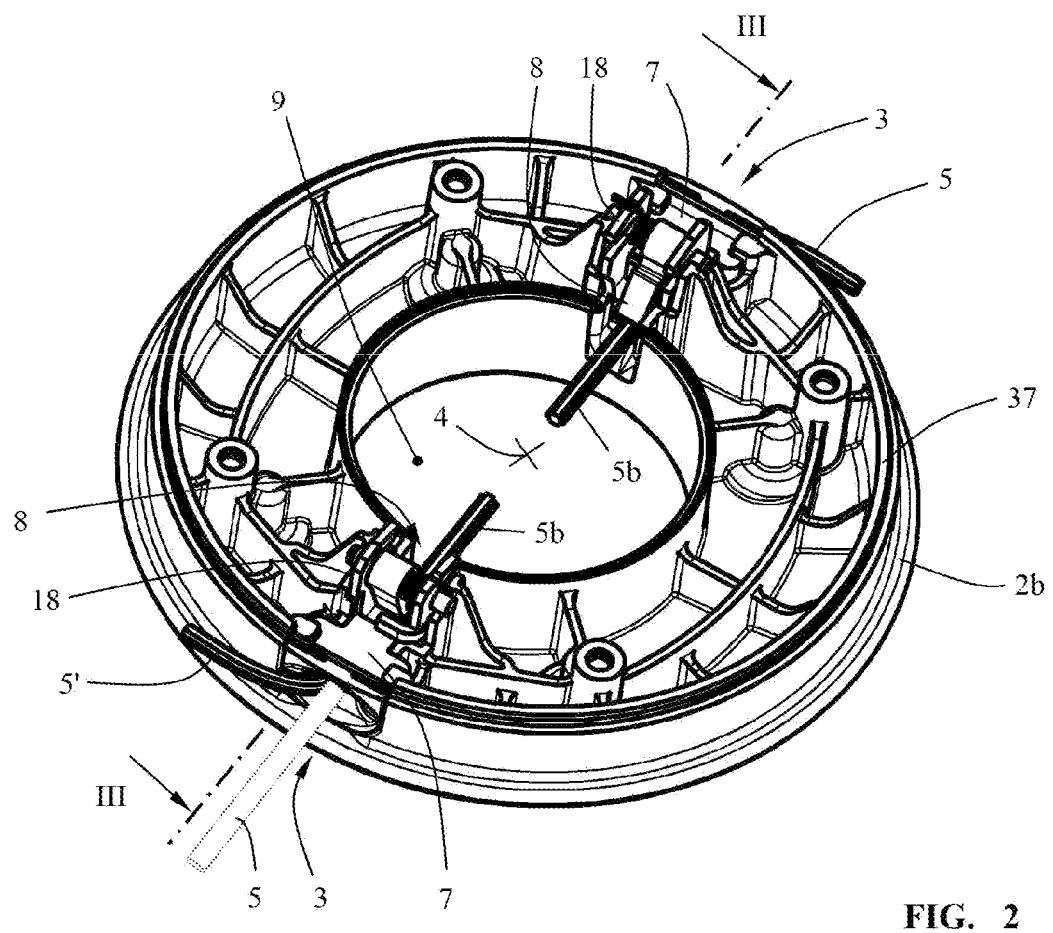
FIG. 2 is a view of the base member of the trimmer head according to FIG. 1 with top part removed.

In the illustrated embodiments, trimmer heads 1 for trimmers are illustrated that are furnished with trimmer lines 5 (FIG. 2). As illustrated in FIG. 1, a trimmer head 1 is comprised of a substantially rotation-symmetrical base member 2 having in its circumferential wall 37 at least two trimmer line openings 3 which, relative to the axis of rotation 4 of the trimmer head 1, are expediently positioned diametrically opposite to each other.

The base member 2 is comprised of a top part 2a and a bottom part 2b that are connected to each other by fastening screws 6 and together form the base member 2. When the top part 2a is detached, the bottom part 2b can be seen, as illustrated in FIG. 2. In the embodiment according to FIGS. 2 through 4, the bottom part 2b has two trimmer line openings 3 that relative to the axis of rotation 4 are positioned diametrically opposite to each other. Other arrangements may be expedient also, for example, three trimmer line openings that in the rotational direction are displaced relative to each other by 120°. Also, four or six trimmer line openings may be provided with clamping devices 8 arranged behind them. Each trimmer line opening 3 is advantageously formed by an outlet sleeve 7 which is securely held in the base member 2, i.e., in the bottom part 2b. An outlet sleeve 7 is expediently positioned immediately in front of a clamping device 8 for the trimmer line 5 which is positioned approximately radially stretched when the trimmer head rotates. When the trimmer line impinges on an obstacle, a bent or folded position results as indicated by the trimmer line 5'.

The bottom part 2b of the base member 2 has an annular shape with a free center 9. The trimmer line 5 is inserted radially from the exterior through the outlet sleeve 7 into the clamping device 8 so far that the inner end 5b of the trimmer line 5 projects into the free center 9 of the interior of the base member 2. When the effective or working end of the trimmer line which is projecting outwardly past the circumferential wall 37 is worn or the trimmer line 5 breaks off at the trimmer line opening 3, the trimmer line 5 can be removed from the clamping device 8 by pulling at its inner end 5b.

Figure 3:
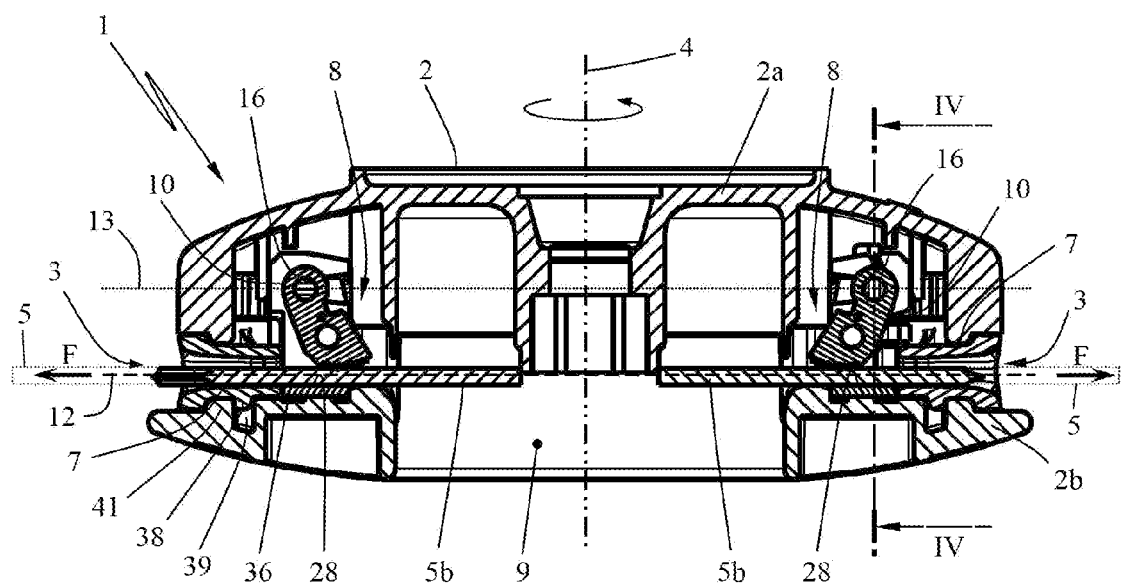
FIG. 3 is a section view of the base member along the section line of FIG. 2.

As shown in FIG. 3, the clamping device 8 has a clamping member 10 which is pivotable about pivot bolt 16. The pivot axis 26 of the pivot bolt 16 is positioned in a plane 13 which is approximately parallel to a cutting plane 12 of the trimmer line 5 that results upon rotation of the base member 2 of the trimmer head 1 about axis of rotation 4. By means of the clamping member 10, the trimmer line 5 is clamped in the base member 2 wherein the radial centrifugal forces F that are acting on the trimmer line 5 in the longitudinal direction force the clamping member 10 that is engaging the trimmer line 5 into the clamping position; the clamping action of the trimmer line 5 in operation of the trimmer head 1 is thus self-reinforcing.

According to the invention, the clamping device 8 forms an independent modular unit 18 which can be pre-assembled with a few manipulations in a simple way. The pre-assembled unit is then inserted into a receptacle 14 of the base member 2. In the illustrated embodiment, this is the receptacle 14 in the bottom part 2b so that the clamping device 8 is safely and also captively (after attaching the top part 2a) secured in the receptacle 14.

Figure 4:
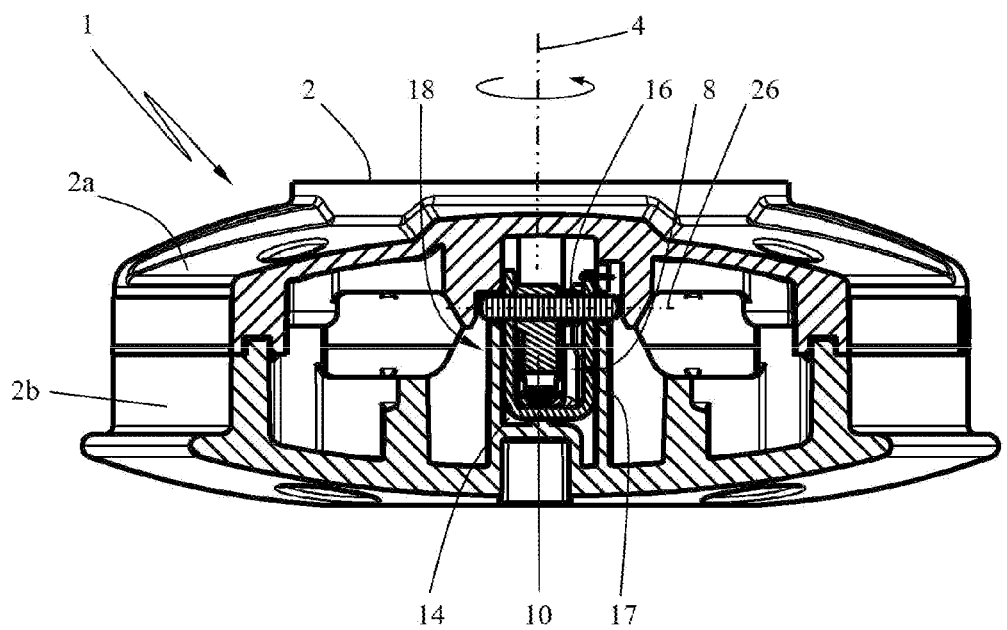
FIG. 4 is a section view of the base member along the section line IV-IV of FIG. 3.
Figure 5:
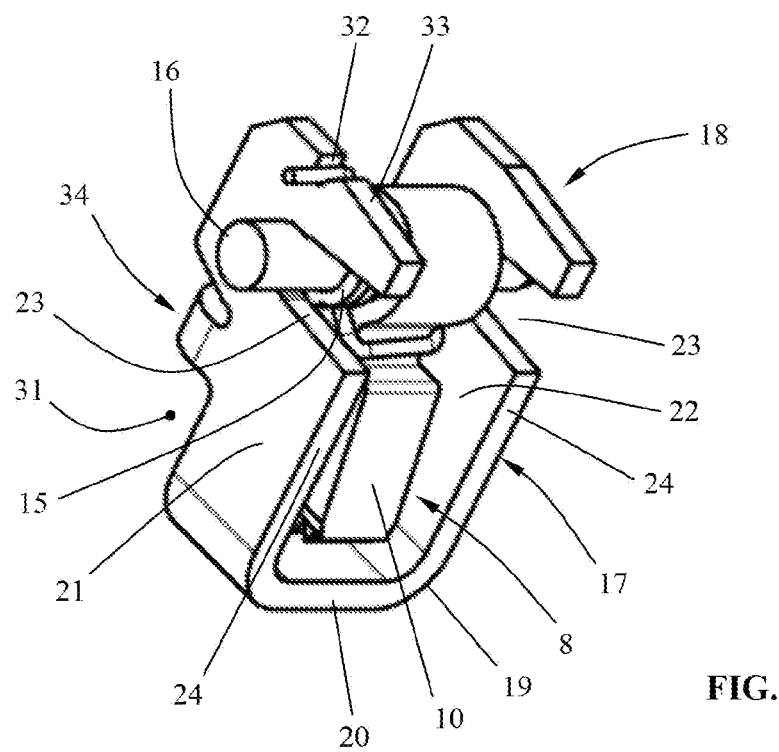
FIG. 5 is a perspective view of the clamping device to be inserted into the base member.

The clamping device 8 that is used in the embodiment according to FIGS. 2 through 4 is illustrated in FIGS. 5 to 9 in detail.

In a first embodiment, the clamping device 8 is comprised substantially of the clamping member 10 a clamping spring 25, and the pivot bolt 16 which serves as a support; the three parts 10, 25, 16 together are secured on the common component 17.

Figure 6:
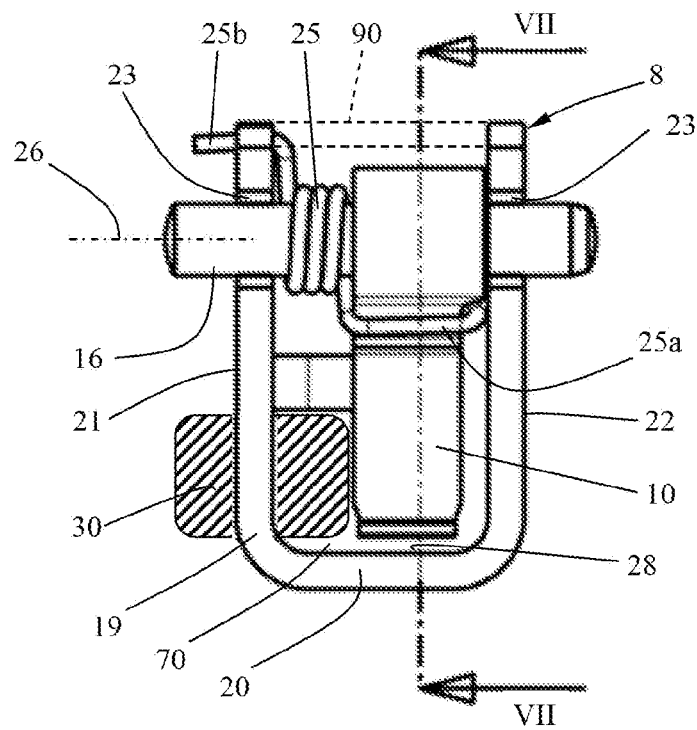
FIG. 6 is a rear view of the clamping device.

In the illustrated embodiment, the common component 17 is a U-shaped bracket 19 that is substantially symmetrical to a center plane (compare FIG. 6). The bracket 19 is comprised of two bracket legs 21 and 22 that are parallel to each other and are connected at their first end by the stay 20. It may be advantageous to reinforce the U-shaped bracket also in the area of its open end by a stay 90 (dashed line illustration) that connects the free second ends of the bracket legs 21, 22 with each other. The term U-shaped bracket refers to a basic component that is important for the configuration of the invention. This basic component can be supplemented, for example, can be closed by the stay 90 as mentioned above, or can be embodied as a closed configuration comprising the basic component (U-shaped bracket).

In the illustrated embodiment, the bracket legs 21 and 22 are perpendicular to the plane of the stay 20. In the area of the free second ends of the bracket legs 21 and 22, slots 23 are provided at the same level and are open toward a longitudinal edge 24 of the bracket legs 21 and 22. The longitudinal edges 24 are positioned on the rear side 50 (FIG. 8) of the clamping device 8.

The pivot bolt 16 is positioned with its end sections in the slots 23 so that the pivot bolt 16 is supported on the bracket leg ends. The pivot bolt 16 supports the clamping member 10 wherein the clamping member 10 can be rotatably supported on the pivot bolt 16. A monolithic configuration of clamping member 10 and pivot bolt 16 may also be expedient.

On a lateral surface of the clamping member 10, a clamping spring 25, designed in the illustrated embodiment as a leg spring or spiral spring, is positioned between the clamping member 10 and the bracket leg 21 of the bracket 19. A first spring leg 25a of the spiral spring engages about the clamping member 10. The second spring leg 25b of the spiral spring is positioned in a locking recess 32 of the bracket leg 21. The locking recess 32 is formed in the end face 33 of the bracket leg end of the bracket leg 21.

Figure 7:
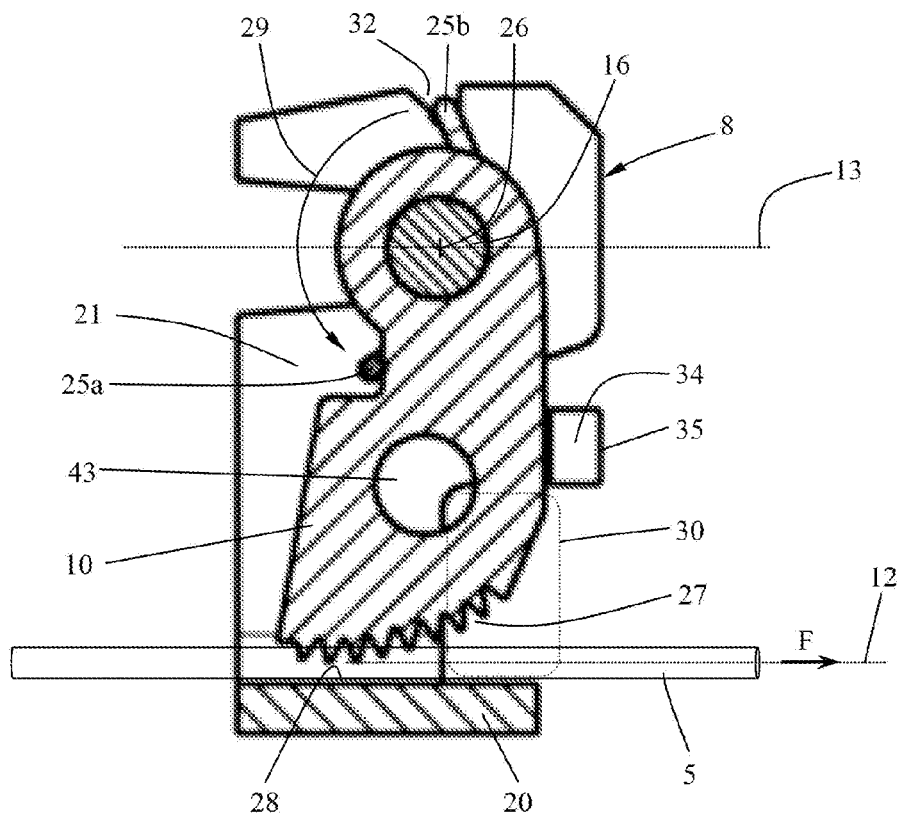
FIG. 7 is a section view of the clamping device along the section line VII-VII of FIG. 6.
Figure 8:
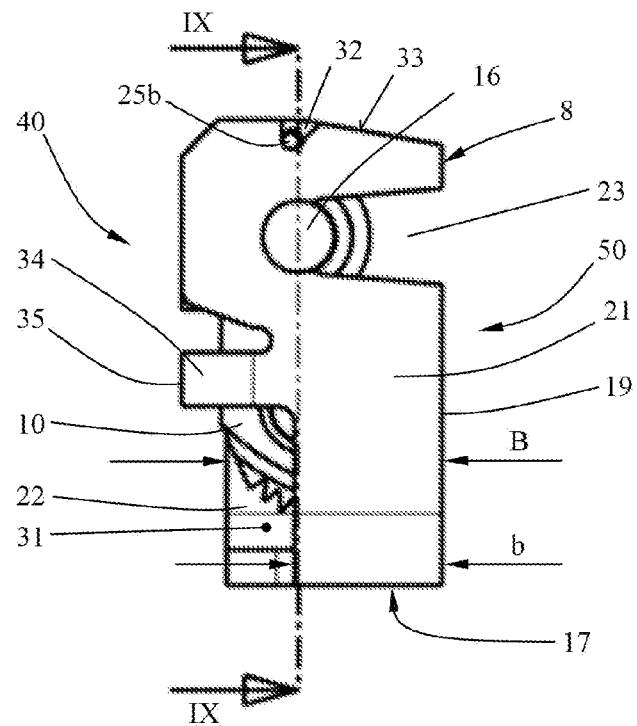
FIG. 8 is a side view of the clamping device of FIG. 5.

As shown in FIG. 7, the clamping member 10 is designed as a single-arm lever which is supported with a first end on the pivot bolt 16 and with the second end (clamping end) engages by clamping action the trimmer line 5. The clamping end of the lever is preferably elliptically rounded and provided with a toothing 27 that digs into the trimmer line 5 and secures the trimmer line 5 by clamping it between the clamping surface 28 on the bracket 19 and the clamping member 10. The clamping surface 28 in the illustrated embodiment is formed on the stay 20 of the U-shaped bracket 19 that connects the first ends of the bracket legs 21 and 22.

The clamping spring 25 is arranged such that it loads the clamping element 10 into the clamping position illustrated in FIG. 7. The spring force is thus acting in the rotational direction 29. In order to limit the pivot travel of the clamping member 10 in the rotational direction 29, a stop 34 is formed on the bracket 19. The stop 34 is expediently formed by a bent tab 35 that is formed integrally or monolithically on the bracket 19 and is bent so as to intercept the travel path of the clamping member 10.

Figure 9:
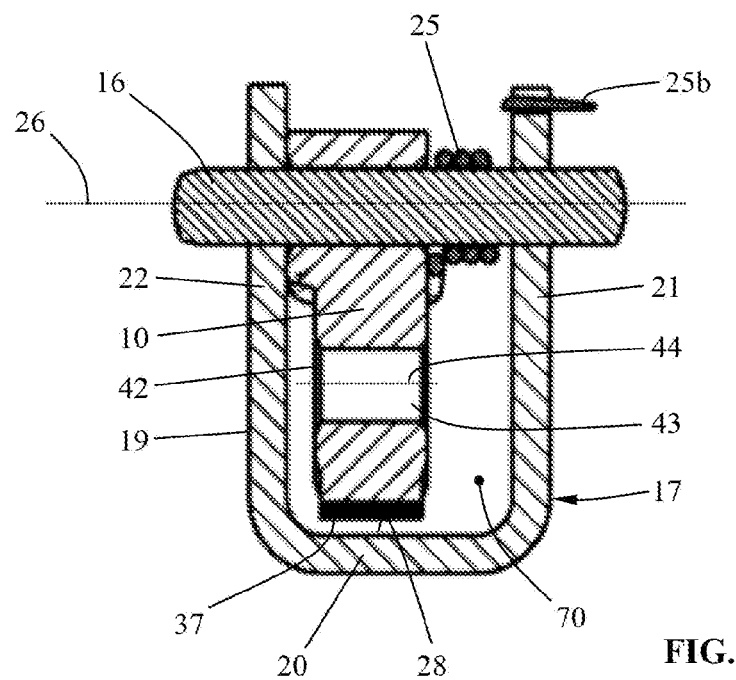
FIG. 9 is a section view along the section line IX-IX of FIG. 8.

As shown in FIGS. 6 and 9 the clamping member 10 is arranged off-center between the bracket legs 21 and 22 of the U-shaped bracket 19. This off-center position is caused by the clamping spring 25 which is mounted on the pivot bolt 16. In order to ensure that upon insertion of a trimmer line 5 the latter will be positioned safely between the clamping element 10 and the clamping surface 28, a wall element 30 is provided on the base member 2 of the trimmer head. This wall element 30 covers the free space 70 that is caused by the spiral spring 25 positioned between the clamping element 10 and the bracket leg 21. The wall element 30 projects, as shown in particular in FIG. 6, into the contour of the bracket 19. In order to provide an expedient arrangement site for the wall element 30, a cutout 31 for the wall element 30 is provided on the bracket 19. Expediently, the width b of bracket leg 21 is therefore reduced across a portion of its length in comparison to the width B of the other bracket leg 22. The cutout 31 which is provided in this way at the bracket leg 21 is closed off by the projecting wall element 30 (FIG. 6). The wall element 30 is extending up to the lateral surface of the clamping element 10.

The pivot bolt 16 which is inserted radially into the slots 23 of the bracket leg ends is secured by the clamping spring 25 in its mounted position on the bracket 19. In order for the clamping element 10 to assume a defined initial position, stop 34 for limiting the rotational movement of the clamping member 10 in rotational direction 29 is provided on the front side 40 of the clamping device 8. The stop 34 is an integral bent tab 35 of the bracket leg 21 that is bent relative to the plane of the bracket leg 21 toward the clamping member 10 and on which the clamping member 10 is resting as a result of the action of the clamping spring 25.

As can be seen in FIG. 3, the clamping surface 28 is positioned at the same level as the lower edge 36 of the trimmer line opening 3. Expediently, the trimmer line opening 3 is formed by an outlet sleeve 7 which is secured in the circumferential wall 37 (FIG. 2) of the base member 2.

The outlet sleeve 7 has a rim 38 with which it engages a recess or receptacle 39 of the base member 2. Expediently, the outlet sleeve 7 engages across a circumferential rim 41 of the base member 2 or the bottom part 2b of the base member 2 (FIG. 3).

As illustrated in FIGS. 7 and 9, the clamping member 10 has a countersunk hole 42 in at least one lateral surface so that the weight of the clamping member 10 is reduced and the center of gravity of the clamping member 10 is moved close to the pivot axis 26. In this way, the effect of the occurring centrifugal forces on the clamping member 10 can be reduced, i.e., the clamping forces which are additionally acting on the trimmer line 5 due to the centrifugal force acting on the pawl-shaped clamping member 10 are reduced so that the maximum clamping load on the trimmer line 5 is reduced and determined substantially by the clamping spring 25 alone. Expediently, the countersunk hole 42 is a bore 43, in particular a penetrating bore 43 whose bore axis 44 is approximately parallel to the pivot axis 26 of the pivot bolt 16.

The U-shaped bracket 19 is comprised in particular of metal and is in particular bent into the desired shape from a metal strip. In this connection, the free second ends of the bracket legs 21 and 22 can be bent toward each other and can overlap each other so that a stay 90 (dash-dotted line illustration) that closes off the opening of the "U" is formed; this increases the stiffness of the component.

Figure 10:
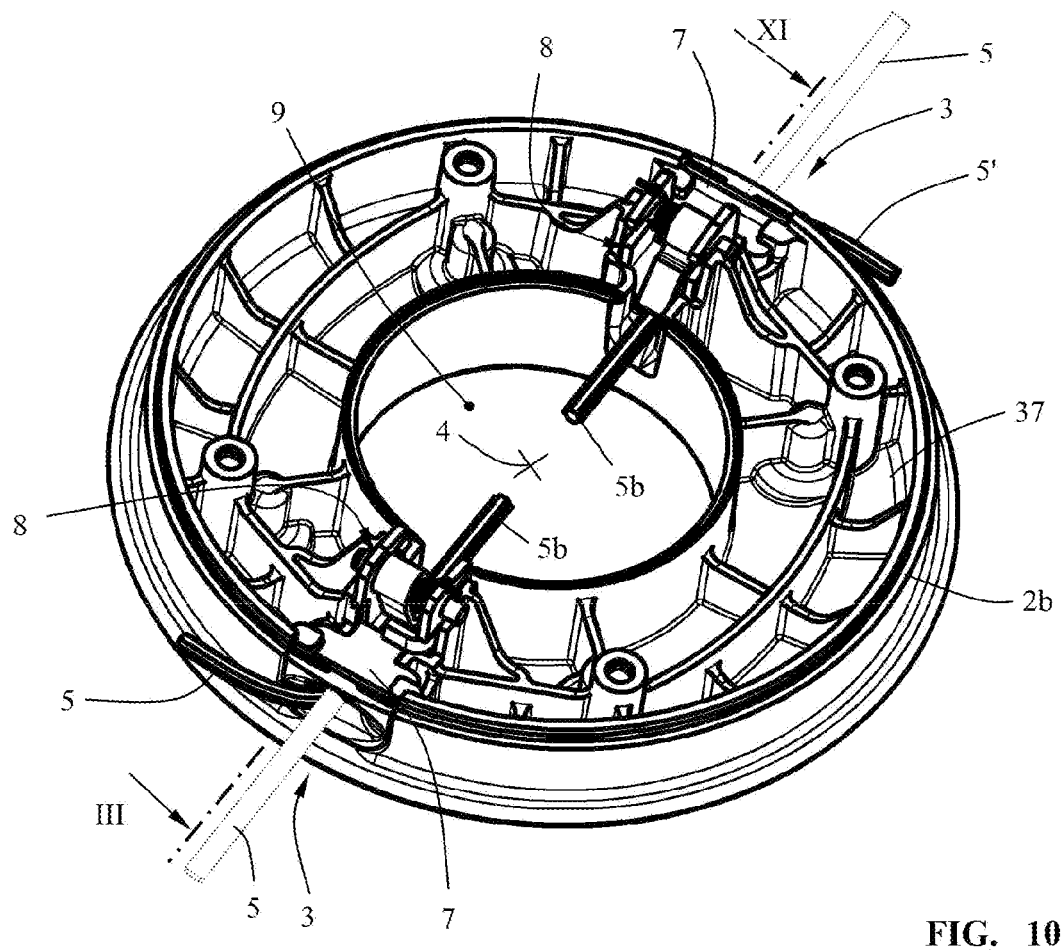
FIG. 10 is a further embodiment of the trimmer head in an illustration in accordance with FIG. 2.
Figure 11:
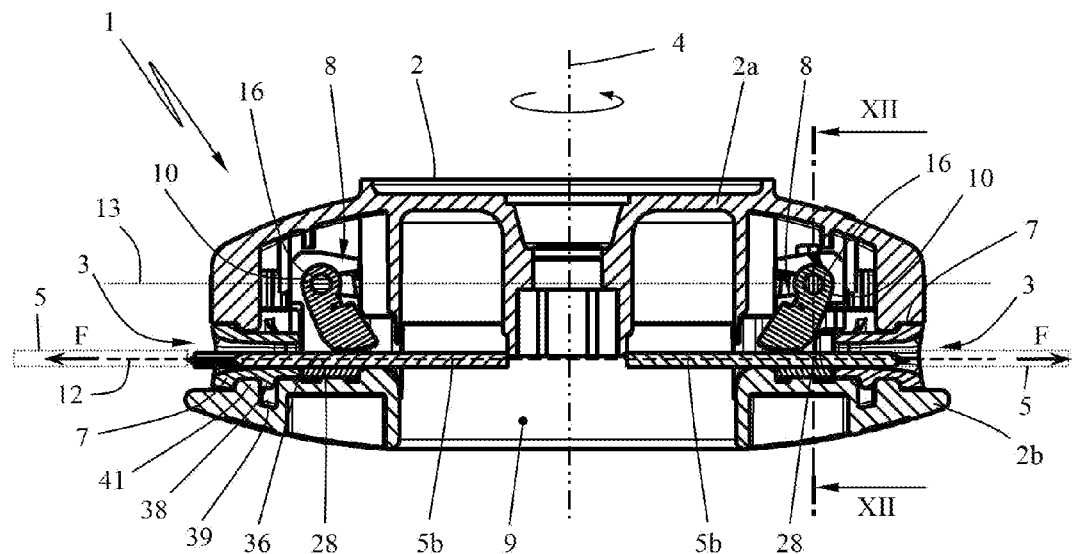
FIG. 11 is a section view of the trimmer head along the section line XI-XI of FIG. 10.
Figure 12:
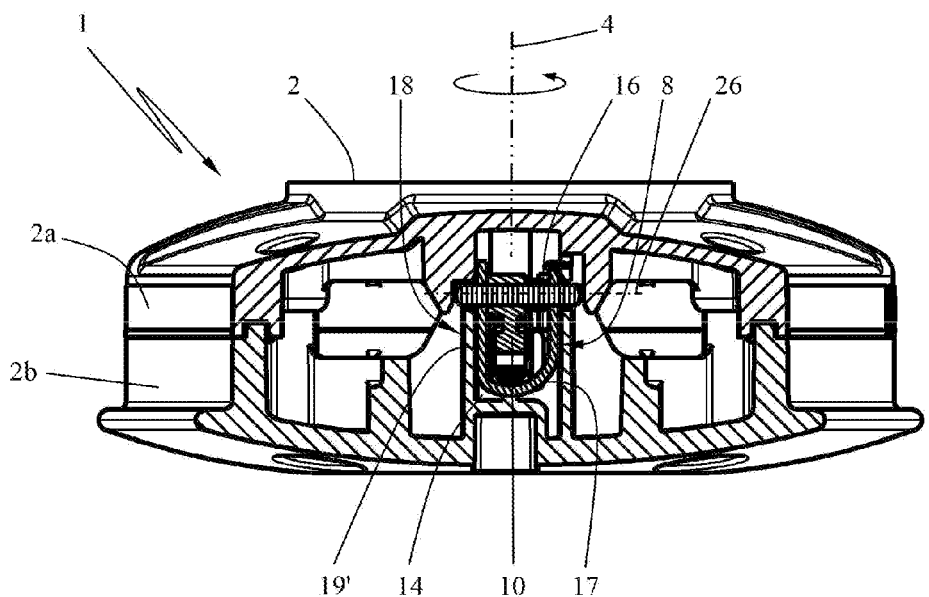
FIG. 12 is a section view of the base member of the trimmer head according to section line XII-XII of FIG. 11.
Figure 13:
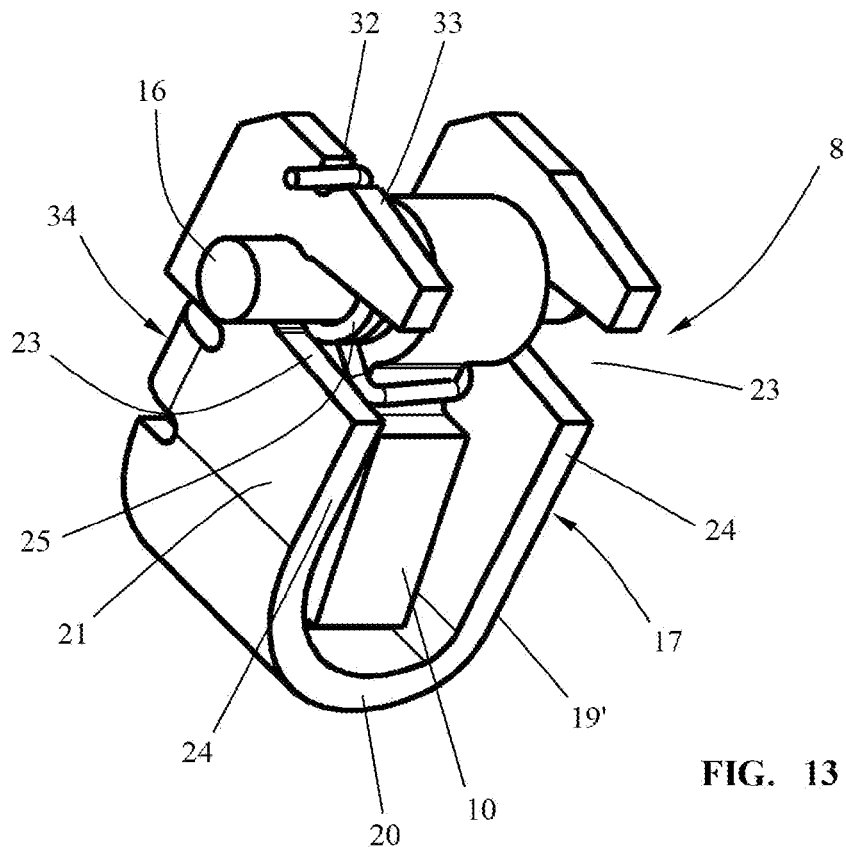
FIG. 13 is a perspective view of a further embodiment of a clamping device.

The trimmer head in the embodiment according to FIGS. 10 through 12 corresponds in its basic configuration to that of FIGS. 2 to 4 so that for same parts same reference characters are used.

Figure 14:
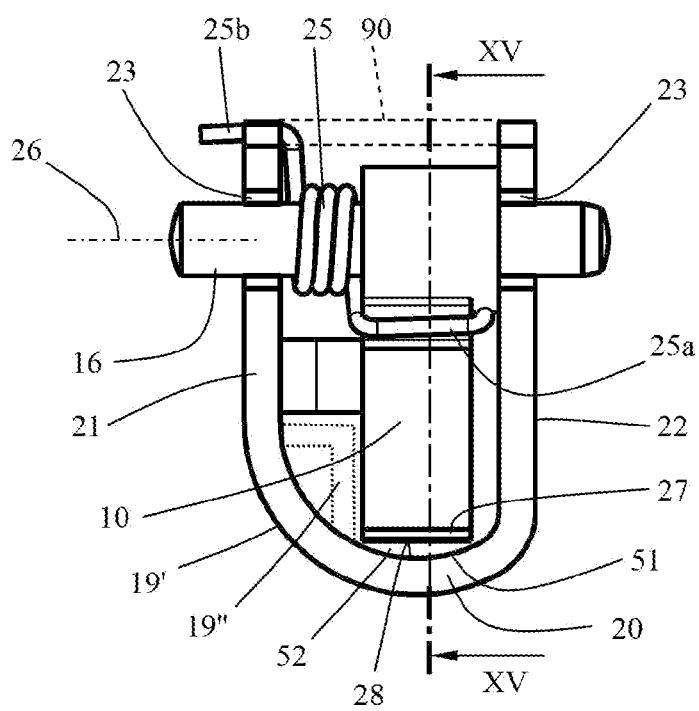
FIG. 14 is a rear view of the clamping device according to FIG. 13.
Figure 15:
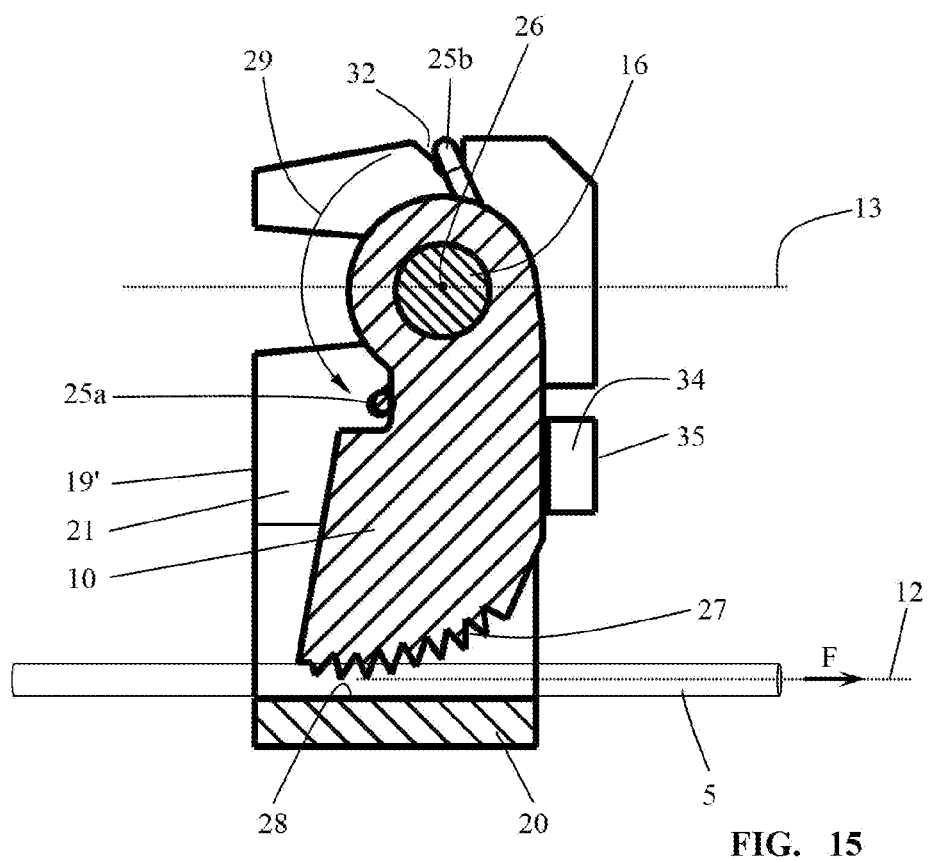
FIG. 15 is a section view of the clamping device according to FIG. 13 along the line XV-XV of FIG. 14.
Figure 16:
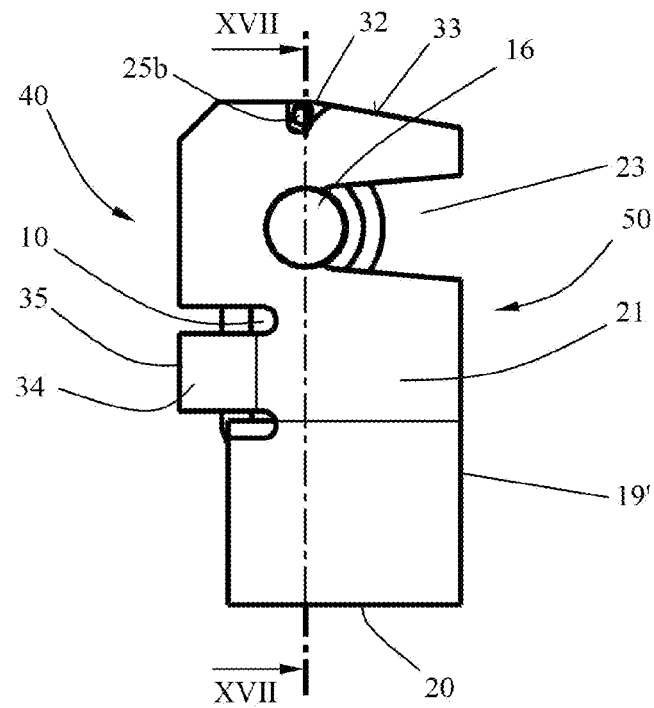
FIG. 16 is a side view of the clamping device according to FIG. 13.
Figure 17:
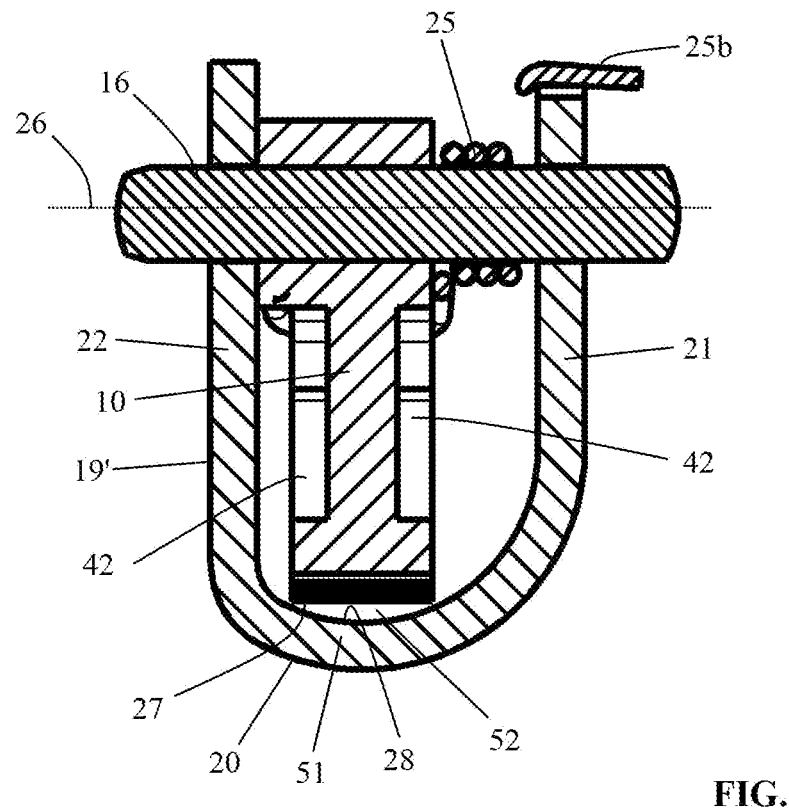
FIG. 17 is a section view along the section line XVII-XVII of FIG. 16.

As can be seen in the illustration according to FIG. 14, the U-shaped bracket 19' of the clamping device 8 is asymmetrically formed relative to a center plane. FIGS. 13 to 17 show the clamping device 8 with an asymmetrically designed bracket 19' which however in its basic configuration corresponds to the shape of the bracket 19 of the clamping device 8 according to FIGS. 5 to 7 so that for same parts same reference characters are used.

The U-shaped bracket 19' is comprised of two parallel extending bracket legs 21 and 22 wherein however the bracket leg 21 is shorter than the bracket leg 22. The stay 20 which is connecting the bracket legs 21 and 22 is rounded in such a way that below the clamping element 10 a substantially symmetrical arc section 51 is formed. It may be advantageous to also connect the free second ends of the bracket legs 21, 22 by a reinforcing stay. Between the arc section 51 and the clamping member 10 there is a clamping space 52 in which the trimmer line 5 is to be inserted for being clamped. When the trimmer line 5 is inserted radially into the trimmer line opening 3, the trimmer line 5, as a result of the rounded stay 20, is mandatorily positioned in the area of the arc section 51 and therefore is positioned reliably below the clamping member 10. Due to the rounded stay 20 with the part-circular arc section 51, it is ensured that the trimmer line 5 cannot escape into the free space that is caused by arranging the clamping spring 25 between the bracket leg 21 and the clamping member 10. The rounded stay 20 connects the shorter bracket leg 21 with the longer bracket leg 22 wherein the free second ends of the bracket legs 21 and 22 are positioned approximately at the same level. The rounded stay 20 narrows the free space positioned between the clamping member 10 and the bracket leg 21 so that a faulty position of a trimmer line 5 that is to be clamped is prevented. The stay 20 is essentially provided with a groove.

It may be expedient to design the U-shaped bracket 19' such that the free space is filled by a step 19" that is preferably monolithically formed with the bracket 19'. The bracket 19' can be formed in particular with embodiment of the step 19".

Figure 18:
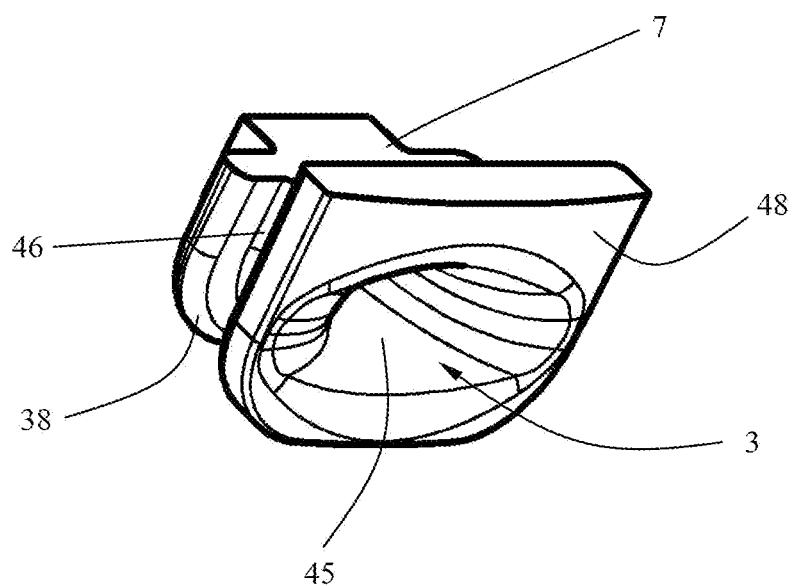
FIG. 18 is a perspective view of an outlet sleeve that is to be inserted into the base member of the trimmer head according to FIGS. 2 through 4.

In FIG. 18 an outlet sleeve 7 is illustrated as it is used in the embodiment according to FIGS. 2 to 4. The outlet sleeve 7 has a funnel-shaped exit opening 45 which enables in operation a supporting action of the trimmer line 5 in the area of the trimmer line opening 3. The outlet sleeve 7 has a rim 38 that together with an end wall 48 delimits a receiving groove 46 that is engaged by a circumferential rim 41 (FIG. 3) of the base member 2 of the trimmer head 1.

Figure 19:
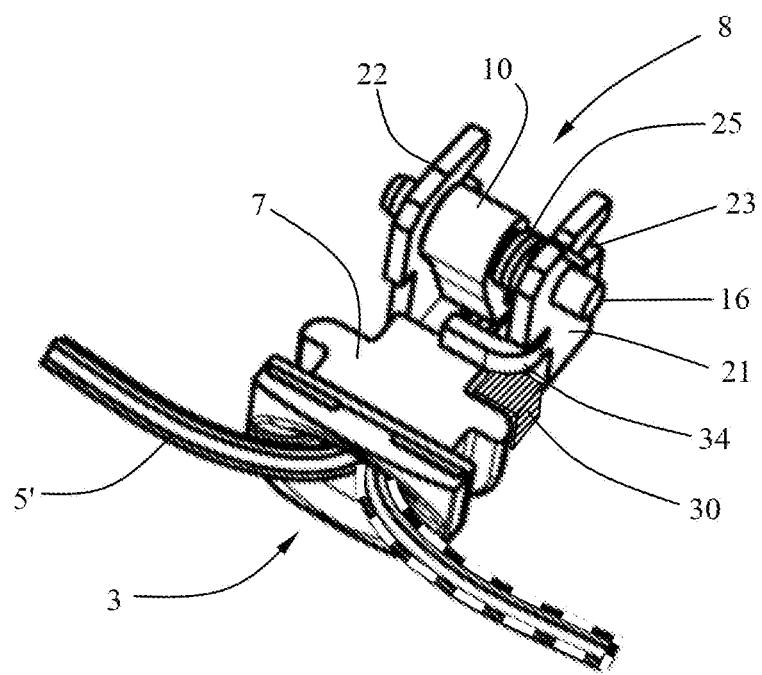
FIG. 19 is a schematic illustration of the position of the outlet sleeve according to FIG. 18 in relation to a clamping device.
Figure 20:
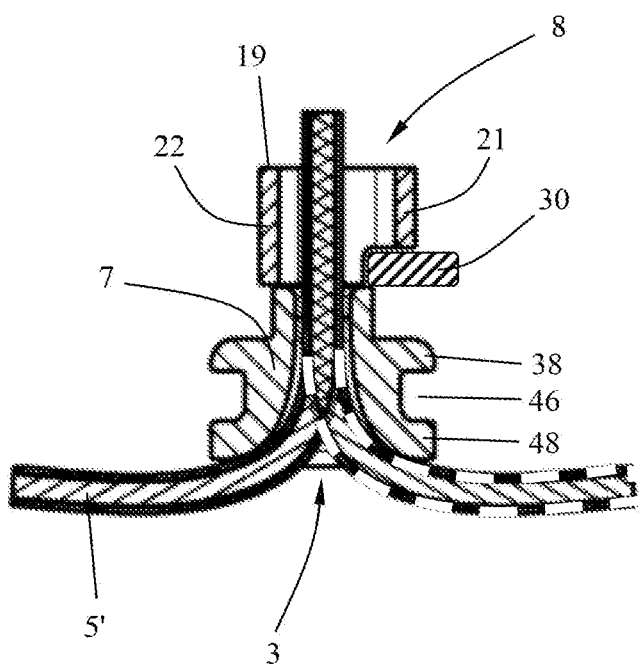
FIG. 20 is a section view of the arrangement according to FIG. 19.

As illustrated in FIGS. 19 and 20, the orientation of the outlet sleeve 7 relative to the clamping device 8 is provided such that one bracket leg 22 of the U-shaped bracket 19 is approximately aligned with the lateral wall of the outlet sleeve 7 (FIG. 20). As shown in FIG. 19, the outlet sleeve 7 is additionally secured in its position in the base member 2 by the stop 34 of the bracket 19. The trimmer line 5 that is receding under load will contact the wall of the outlet sleeve 7, as illustrated by trimmer line 5'. For reversed rotational direction, the trimmer line 5 will contact the wall of the outlet sleeve 7 in accordance with the dash-dotted illustration.

Figure 21:
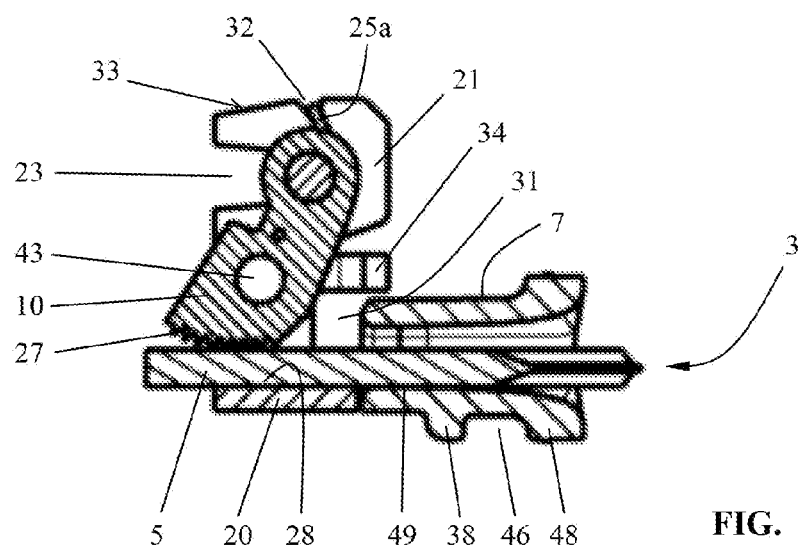
FIG. 21 is a further section view of the arrangement according to FIG. 19.

The longitudinal section of FIG. 21 illustrates that the clamping surface 28 of the stay 20 and the inner surface 49 of the outlet sleeve 7 are approximately positioned in a common plane so that a trimmer line 5 which is inserted through the trimmer line opening 3 into the outlet sleeve 7 can be inserted, without encountering resistance, between the clamping surface 28 of the U-shaped bracket 19 and the clamping member 10.

Figure 22:
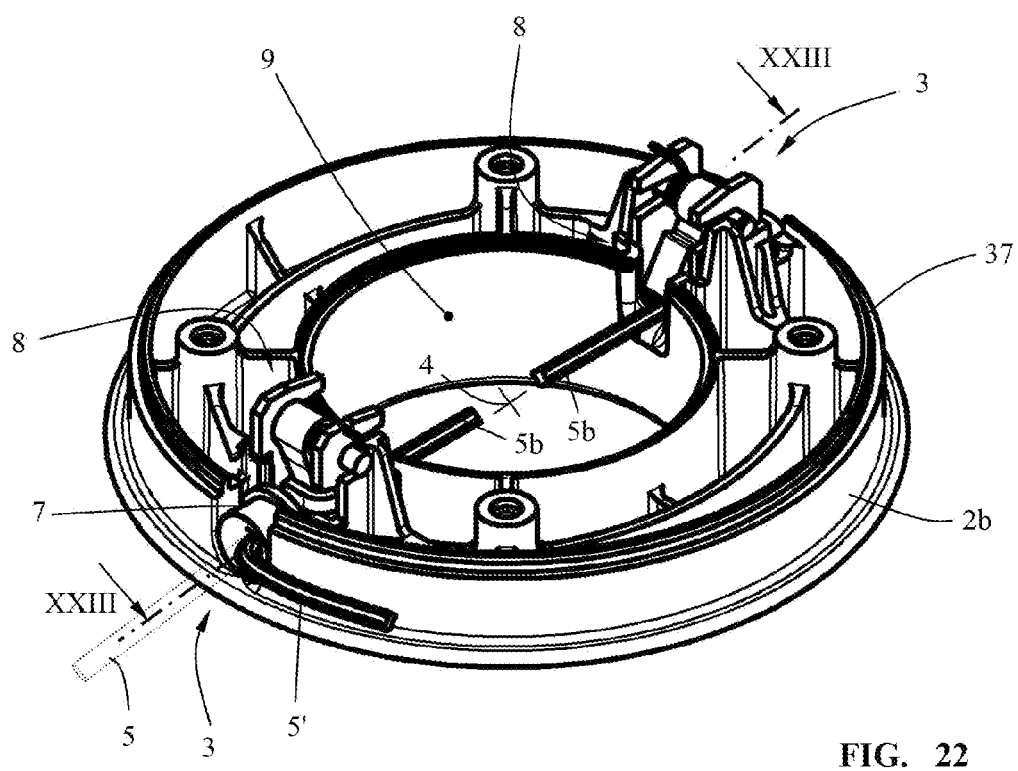
FIG. 22 is a third embodiment of the base member of a trimmer head in a view according to FIG. 2.
Figure 23:
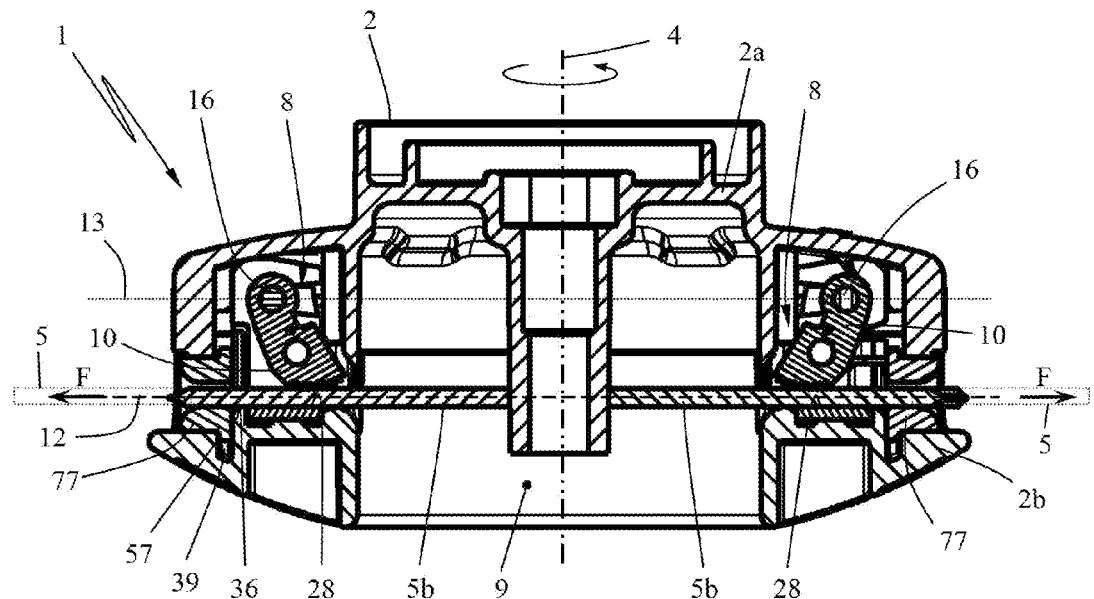
FIG. 23 is a section view along the section line XXIII-XXIII of FIG. 22.
Figure 24:
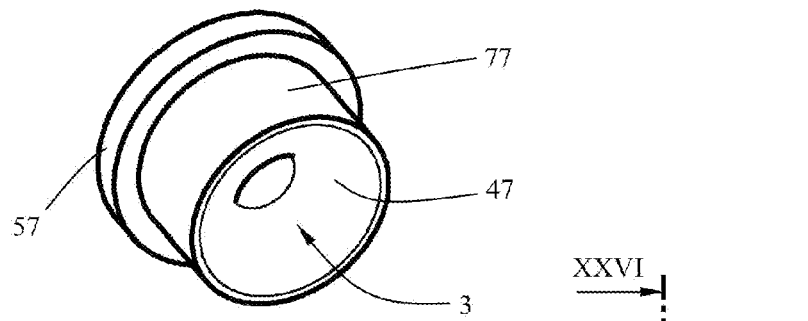
FIG. 24 is a perspective view of an outlet sleeve that is to be inserted into the base member according to FIGS. 22 and 23.
Figure 26:
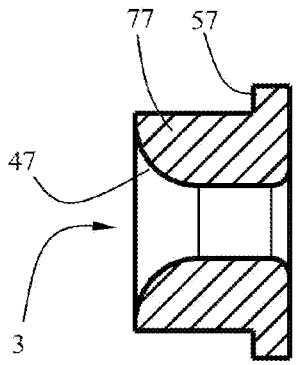
FIG. 26 is a section view of the outlet sleeve along the section line XXVI-XXVI of FIG. 25.
Figure 25:
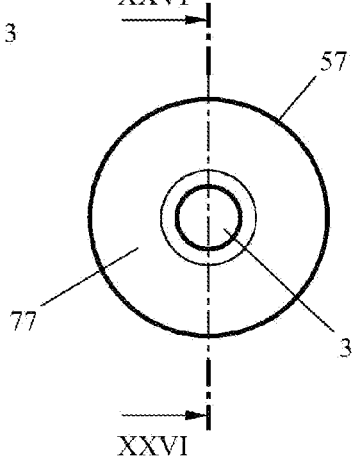
FIG. 25 is a plan view of the outlet sleeve according to FIG. 22.

In the embodiment according to FIGS. 22 and 23, a base member of a trimmer head is illustrated in a further embodiment wherein same parts are identified with same reference characters as in FIGS. 2 through 4. In this further embodiment, the clamping device 8 according to the invention interacts with a simple outlet sleeve 77. The outlet sleeve 77 is substantially cylindrical and has at one end of the trimmer line opening 3 an exit cone 47 which supports a trimmer line in operation. On the end of the cylindrical outlet sleeve 77 opposite the exit cone 47 an annular flange 57 is formed. The annular flange 57 engages, as illustrated in FIG. 23, a receptacle 39 in the base member 2 so that the outlet sleeve 77 is secured against the action of the centrifugal force F. The clamping device 8 which is used in the trimmer head 1 according to FIGS. 22 and 23 can be configured in accordance with FIGS. 5 to 9 or in accordance with FIGS. 13 to 17.

In FIGS. 27 to 31, a further embodiment of a clamping device 8 is shown which in its basic configuration corresponds to the clamping device according to FIGS. 5 to 9. Same parts are identified with same reference characters.

Figure 27:
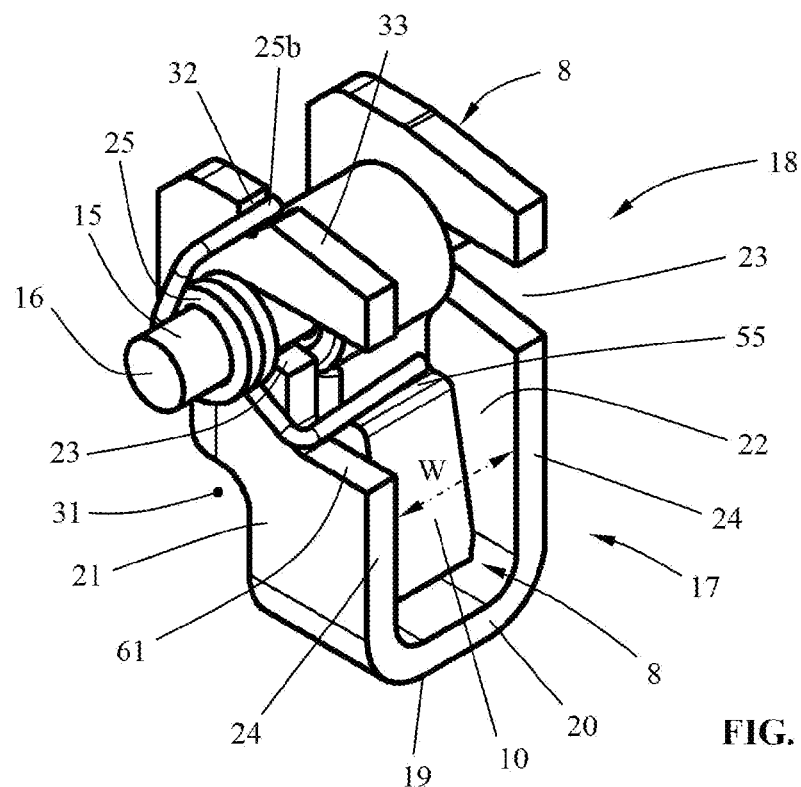
FIG. 27 is a perspective view of a third embodiment of a clamping device according to the invention.
Figure 28:
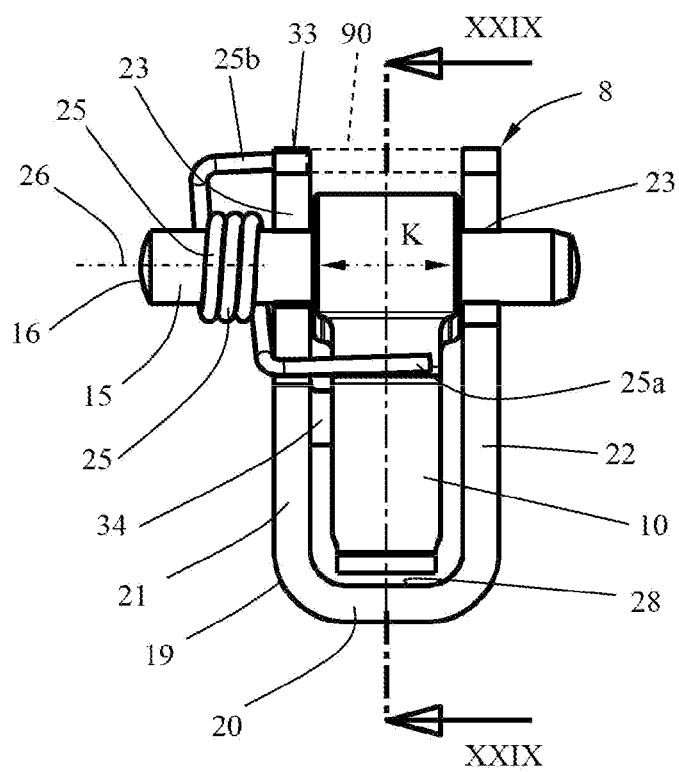
FIG. 28 is a rear view of the clamping device according to FIG. 27.
Figure 29:
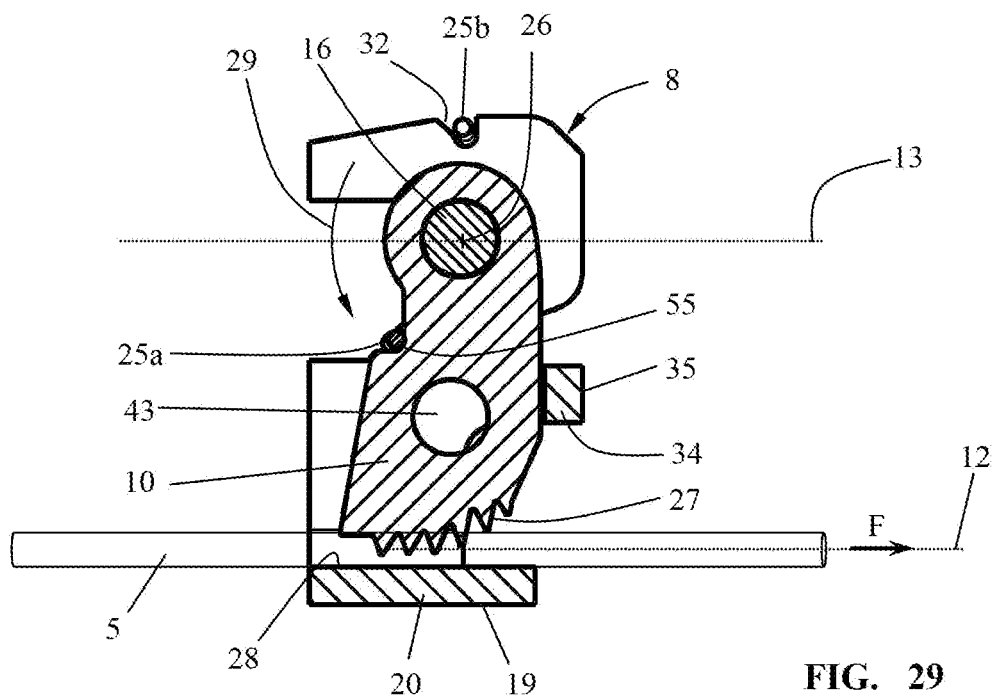
FIG. 29 is a section view of the clamping device according to FIG. 27 along the section line XXIX-XXIX in FIG. 28.
Figure 30:
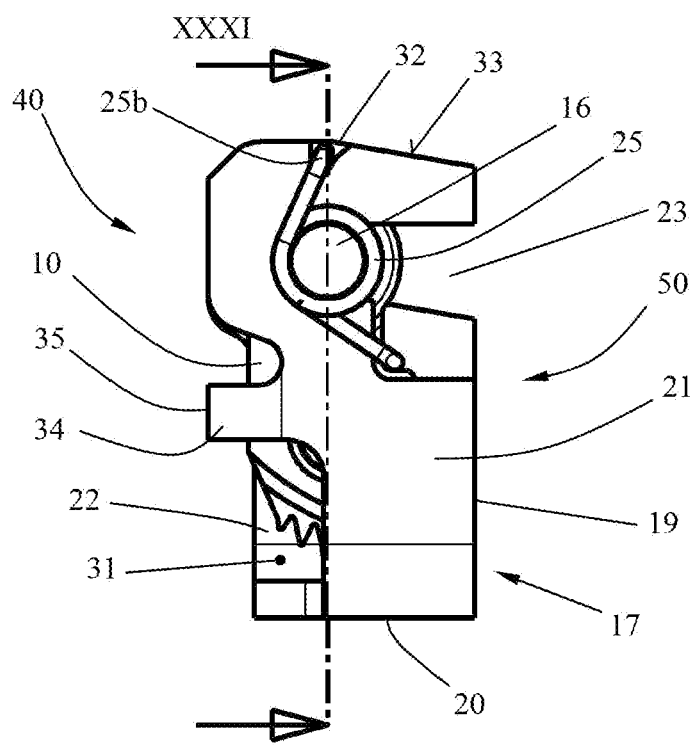
FIG. 30 is a side view of the clamping device according to FIG. 27.
Figure 31:
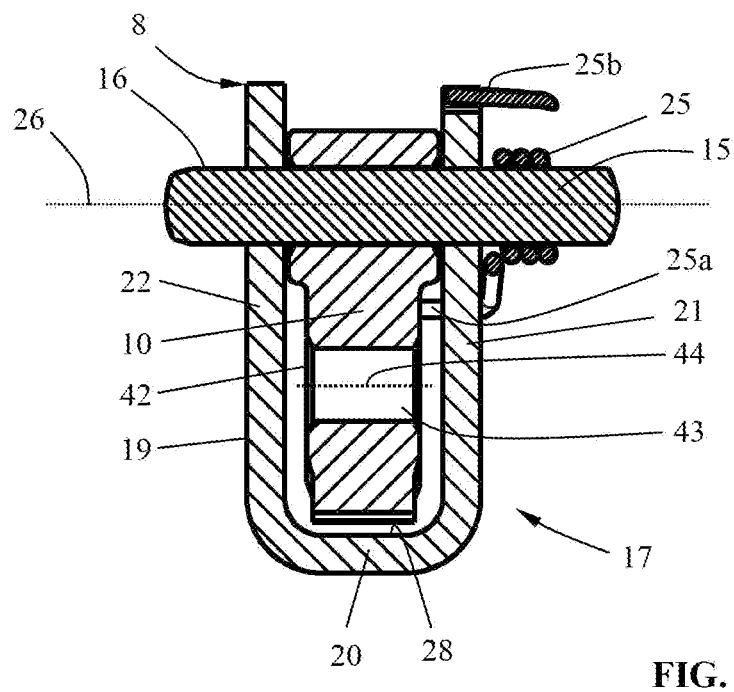
FIG. 31 is a section view of the clamping device along the section line XXXI-XXXI of FIG. 30.
Figure 32:
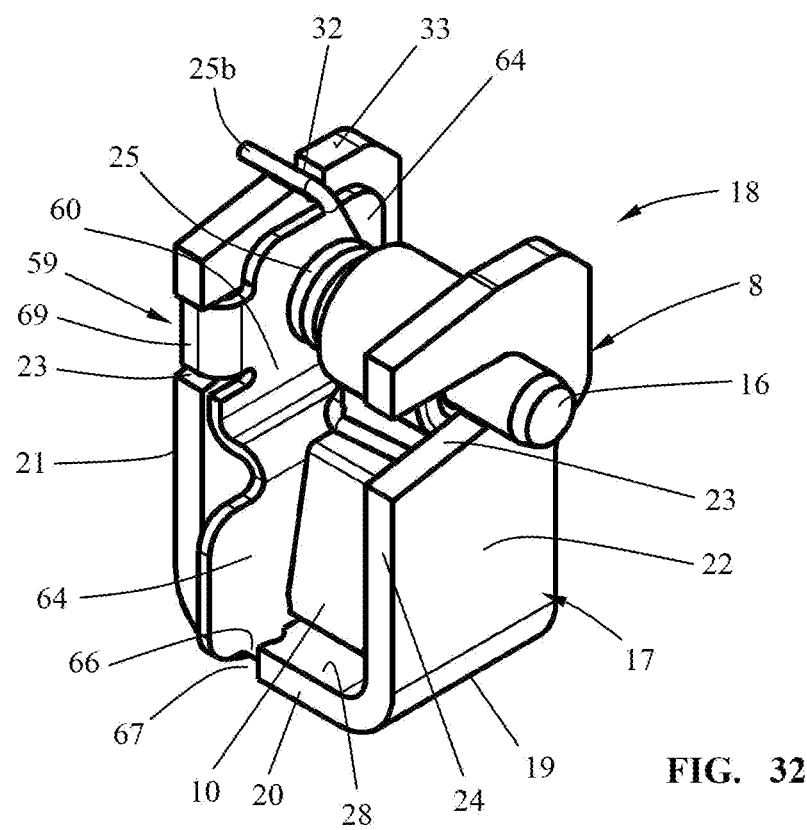
FIG. 32 is a perspective view of a fourth embodiment of a clamping device according to the invention with a filling element.
Figure 33:
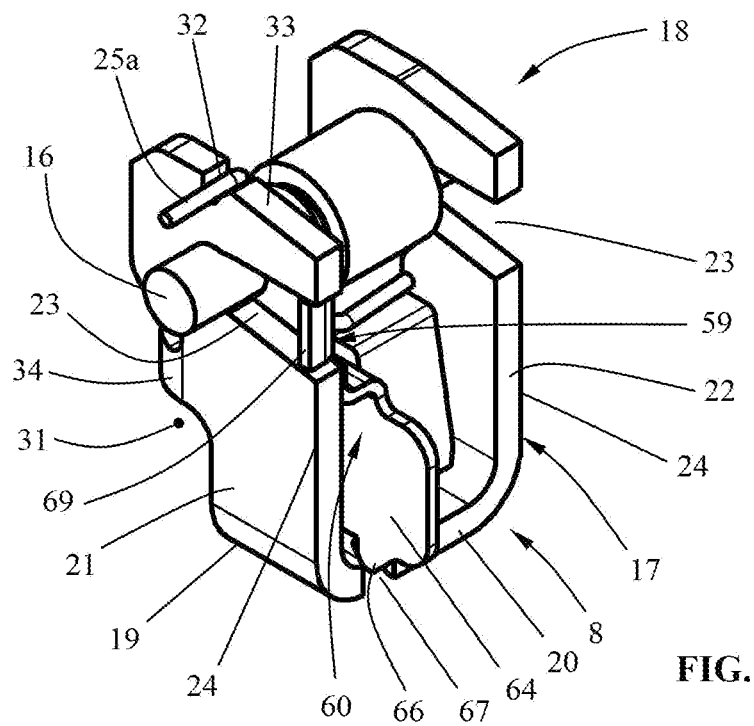
FIG. 33 is a further perspective view of the clamping device according to FIG. 32.

The U-shaped bracket 19 of the clamping device 8 according to FIGS. 27 to 31 has an inner width W which corresponds to the width K of the clamping member 10 in the area of the pivot bolt 16 (FIGS. 27, 28). The clamping member 10 is thus secured between the bracket legs 21, 22 of the bracket 19 substantially without play. At one end, the pivot bolt 16 projects with its end section 15 past the bracket leg 21 of the bracket 19. The clamping spring 25 is pushed onto the end section 15 of the pivot bolt 16 (FIGS. 27, 28, and 31). The first spring leg 25a of the clamping spring 25 projects through a cutout 61 in the bracket leg 21 into the space between the bracket legs 21 and 22 and engages a step 55 of the clamping member 10. The second spring leg 25b of the clamping spring 25 that is embodied as a spiral spring engages a locking recess 32 in the end face 33 of the bracket leg 21, as described above.

The difference of the embodiment according to FIGS. 27 and 31 resides thus substantially in that the clamping member 10 is positioned centrally between the bracket legs 21 and 22 of the bracket 19 and the clamping spring 25 is outside of the bracket 19 and supported on an end section 15 of the pivot bolt 16 that is projecting from the bracket leg 21. This is in particular shown in the section illustration of FIG. 31.

In a further embodiment according to FIGS. 32 to 37, as in the embodiment according to FIGS. 5 to 9, the clamping member 10 is arranged off-center between the bracket legs 21 and 22 of the U-shaped bracket 19. Same parts are identified with same reference characters.

In the embodiment according to FIGS. 5 to 9, the free space 70 that is caused by the arrangement of the clamping spring 25 between the clamping member 10 and the bracket leg 21 of the bracket 19 is covered at least partially by a wall element 30 provided on the base member 2 of the trimmer head 1 so that the trimmer line 5 that is to be inserted into the clamping device 8 cannot escape into the free space 70 of the bracket 19. In the illustrated embodiment according to FIGS. 32 to 35, the free space 70 between the clamping member 10 and the bracket leg 21 of the bracket 19 is filled at least partially by an insertion part 60. As can be seen in particular in FIGS. 32, 34 and 37, the insertion part 60 has a first section 62 that has an opening 63 (FIGS. 38, 40) which is penetrated by the pivot bolt 16. The first section 62 of the insertion part 60 is resting essentially flat on the bracket leg 21 of the bracket 19. The clamping spring 25, embodied as a spiral spring and secured on the pivot bolt 16, is positioned between the section 62 of the insertion part 60 and the clamping element 10.

Figure 38:
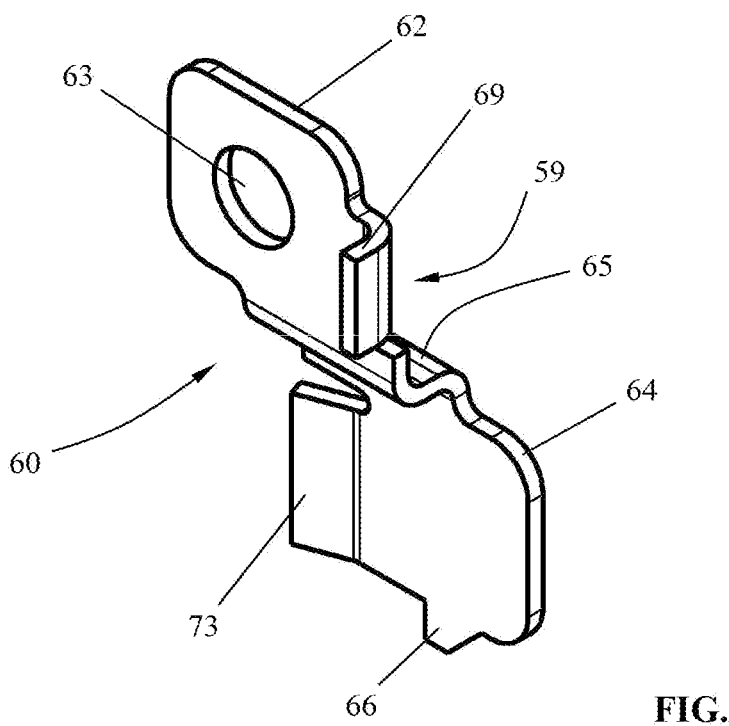
FIG. 38 is a perspective view of the filling element of the clamping device according to FIG. 32.
Figure 39:
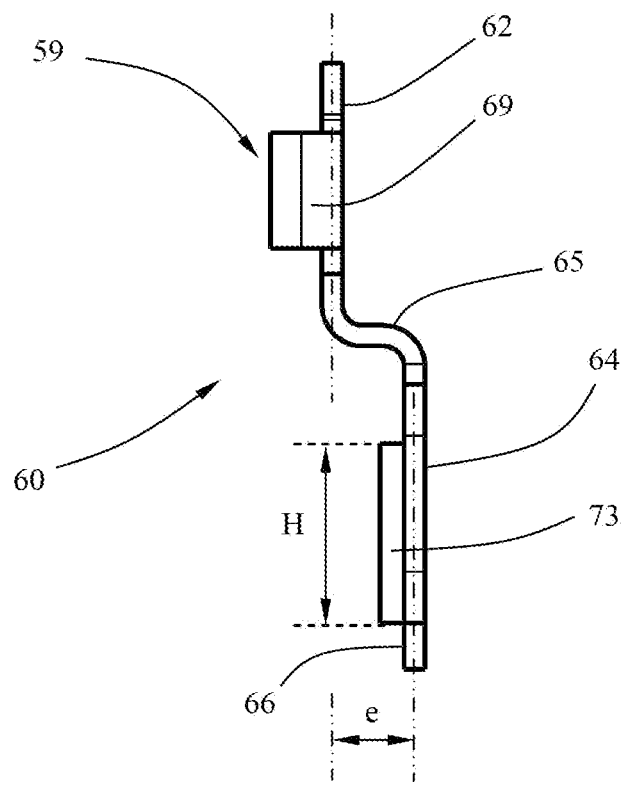
FIG. 39 is a front view of the filling element.
Figure 40:
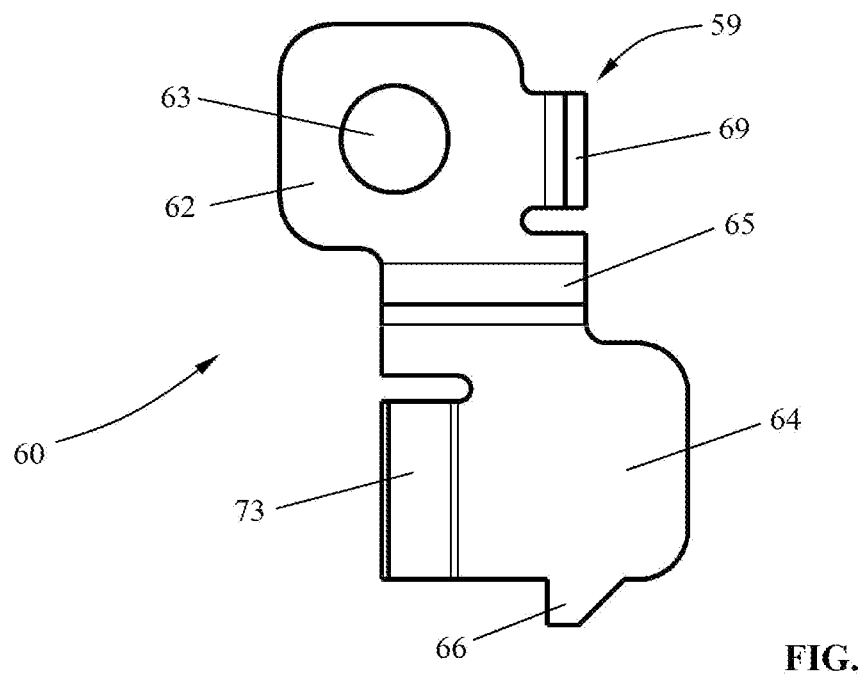
FIG. 40 is a side view of the filling element.

As can be seen in particular in the detail illustrations of the insertion part 60 according to FIGS. 38 to 40, the insertion part 60 is in particular three-dimensionally configured and preferably comprised of a shaped sheet metal part. The first section 62 is connected by means of a shoulder 65 to a second section 64 that is preferably of a flat configuration. The first section 62 which is preferably also flat, is positioned in a plane 72 (FIG. 39) that is parallel to the plane 74 in which the second section 64 is extending. The planes 72 and 74 have a perpendicular distance e relative to each other that corresponds approximately to the inner width L (FIG. 34) of the free space 70. The second section 64 extends substantially across the height of the clamping member 10 and is positioned adjacent to it wherein the flat section 64 has just enough lateral spacing to the clamping member 10 that the clamping member 10 can freely rotate about its pivot axes 26 without impairment by the insertion part 60.

Figure 34:
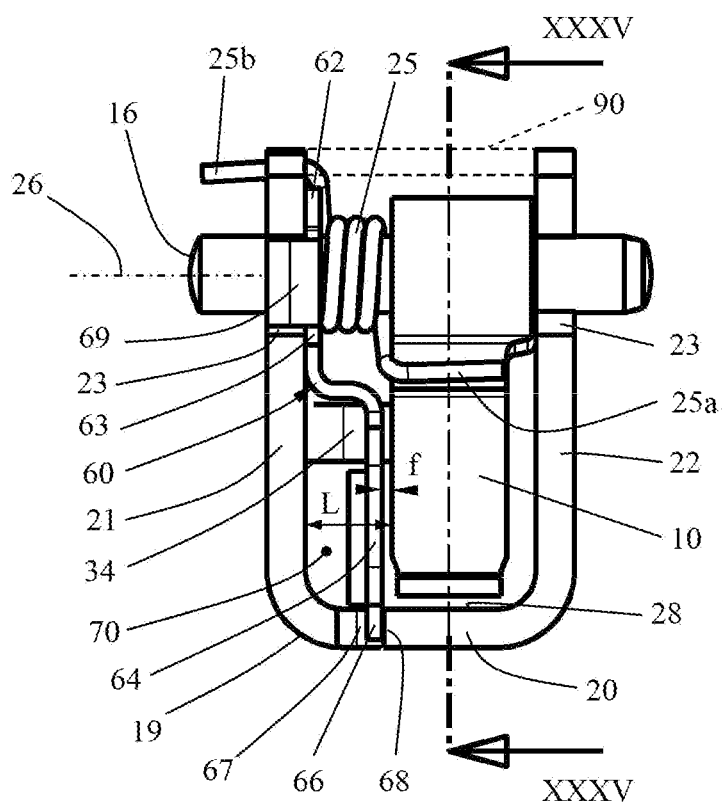
FIG. 34 is a rear view of the clamping device according to FIG. 32.
Figure 35:
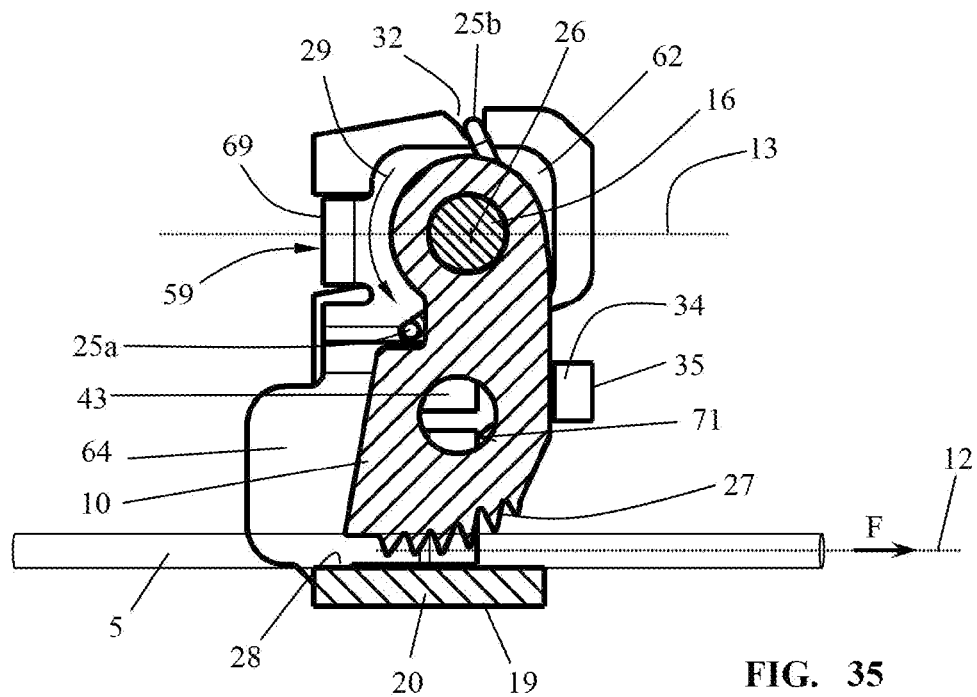
FIG. 35 is a section view of the clamping device according to section line XXXV-XXXV of FIG. 34.
Figure 36:
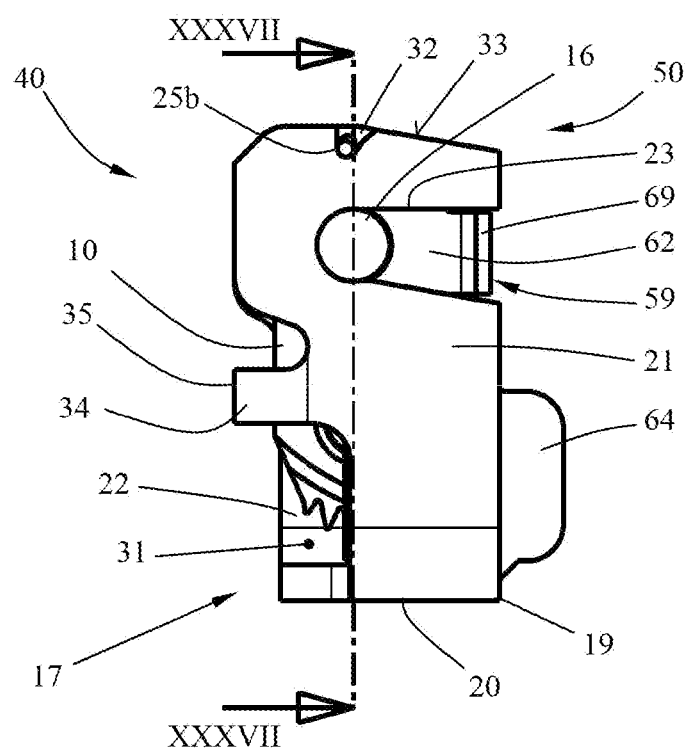
FIG. 36 is a side view of the clamping device according to FIG. 32.
Figure 37:
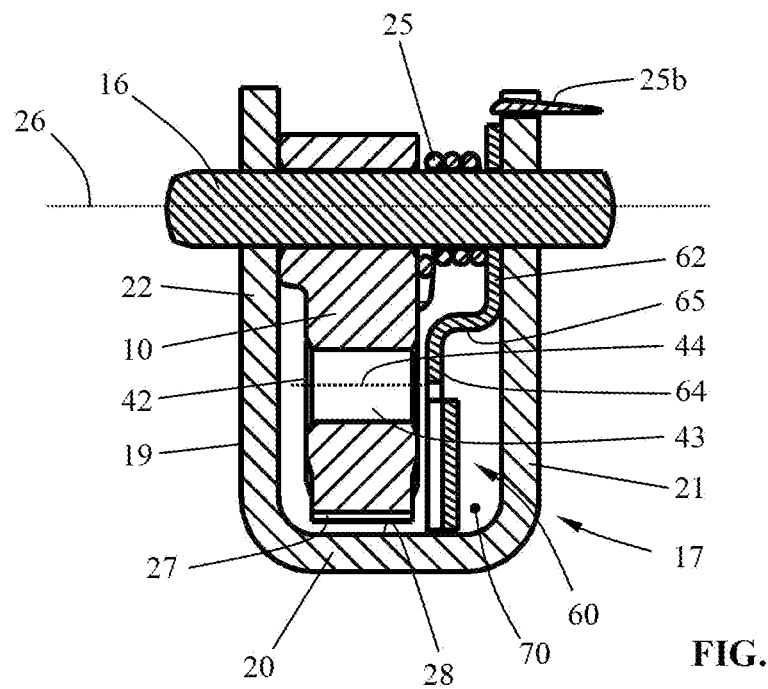
FIG. 37 is a section view of the clamping device along the section line XXXVII-XXXVII of FIG. 36.

The flat section 64 positioned adjacent to the clamping member 10 engages with a projection 66 a recess 67 of the stay 20 so that the flat section 64 is positionally secured relative to the clamping member 10. The projection 66 is resting on a boundary surface 68 of the recess 67 and determines the spacing f between the clamping member 19 and the flat section 64 (FIG. 34). The spacing f is selected such that the clamping member 10 can pivot freely about the pivot axis 26 without impairment by the insertion part 60.

The insertion part 60 is moreover provided with an anti-rotation device 59 that engages a bracket leg 21 of the bracket 19.

In the illustrated embodiment, the anti-rotation device 59 is an integral securing flange 69 that is bent out of the plane of the insertion part 60. The securing flange 69 engages the bracket 19 and secures the insertion part 60 relative to the axis of rotation 26 of the pivot bolt 16. In the illustrated embodiment, the securing flange 69 engages the slot 23 of the bracket leg 21 of the bracket 19, preferably with minimal play or without play.

The insertion part 60 inserted into the free space 70 fills the free space 70 at least partially and is therefore designed as a space-filling insertion part 60.

In the area of the front edge 71, the insertion part 60 is angled across a height H in the direction toward the free space 70 so that the trimmer line 5 to be inserted from the front side 40 is deflected in the direction toward the clamping member 10 by the angled section 73 that is acting like a deflector.

The insertion part 60 can be a shaped sheet metal part, a stamped part or the like and can thus be manufactured in a simple way. The position of the insertion part 60 in the U-shaped bracket is determined by the projection 66 which is positioned in the recess 67 of the stay 20, by the securing flange 69, and by the pivot bolt 16 that extends through the opening 63.

The specification incorporates by reference the entire disclosure of German priority document 10 2013 003 856.1 having a filing date of Mar. 6, 2013.

While specific embodiments of the invention have been shown and described in detail to illustrate the inventive principles, it will be understood that the invention may be embodied otherwise without departing from such principles.

What is claimed is:
1. A trimmer head for a trimmer comprising:
a base member having a trimmer line opening;
an elongate trimmer line that is secured by a clamping action in the base member and that projects through the trimmer line opening from an interior of the base member to an exterior of the base member, wherein the trimmer line, upon rotation of the trimmer head, defines a cutting plane of the trimmer line;
a clamping device arranged in the base member and providing the clamping action acting on the trimmer line, wherein the clamping device comprises a clamping member, a pivot bolt, and a clamping spring;

wherein the clamping member is disposed on the pivot bolt so as to be rotatable, wherein a pivot axis of the pivot bolt is positioned in a plane that is approximately parallel to the cutting plane;

wherein the clamping member has a clamping position and is spring-loaded by the clamping spring in a clamping direction into the clamping position;

wherein the trimmer line is secured in the clamping position between a clamping surface of the clamping device and the clamping member and wherein the clamping member engages the trimmer line in the clamping position such that a centrifugal force acting on the trimmer line additionally loads the clamping member in the clamping direction;

a U-shaped bracket comprising a stay and oppositely positioned bracket legs with a first end and a second end, respectively, wherein the stay connects the first ends of the bracket legs to each other and wherein the second ends form bracket leg ends;

wherein the clamping member is positioned between the bracket legs of the U-shaped bracket;

wherein the pivot bolt is supported on the bracket leg ends;

wherein the stay of the U-shaped bracket forms the clamping surface.

2. The trimmer head according to claim 1, wherein the bracket leg ends each have a slot, wherein the pivot bolt is inserted radially into the slots and is secured by the clamping spring in the slots of the bracket leg ends.

3. The trimmer head according to claim 1, wherein the U-shaped bracket comprises a stop adapted to limit a rotational movement of the clamping member, wherein the stop is a bent tab integrally formed on one of the bracket legs.

4. The trimmer head according to claim 1, wherein the clamping spring is a leg spring that is disposed on the pivot bolt, wherein the clamping spring has a first spring leg engaging the clamping member and a second spring leg secured in a locking recess of a first one of the bracket leg ends.

5. The trimmer head according to claim 4, wherein the locking recess is formed in an end face of said first bracket leg end.

6. The trimmer head according to claim 4, wherein the clamping spring is arranged between the bracket legs.

7. The trimmer head according to claim 6, wherein the clamping member is positioned off-center between the bracket legs.

8. The trimmer head according to claim 7, wherein the base member has a wall element that projects into the U-shaped bracket.

9. The trimmer head according to claim 7, further comprising a space-filling insertion part inserted into a free space that is defined between the clamping member and a first one of the bracket legs.

10. The trimmer head according to claim 9, wherein the insertion part is a three-dimensionally shaped sheet metal part that is penetrated by the pivot bolt and that is secured with an anti-rotation device on the U-shaped bracket.

11. The trimmer head according to claim 10, wherein the anti-rotation device is integrally formed on the insertion part as a securing flange which is bent out of a plane of the insertion part, wherein the securing flange engages a slot of said first bracket leg.

12. The trimmer head according to claim 9, wherein the insertion part comprises a first section and a second section, wherein the first section is resting flat on said first bracket leg and wherein the second section is positioned tightly next to the clamping member.

13. The trimmer head according to claim 4, wherein the pivot bolt has an end section that projects past said first bracket leg end and wherein the clamping spring is arranged on the end section of the pivot bolt outside of the U-shaped bracket.

14. The trimmer head according to claim 1, wherein the clamping surface of the U-shaped bracket and a lower edge of the trimmer line opening are disposed at a same level in the base member.

15. The trimmer head according to claim 1, wherein the trimmer line opening is formed by an outlet sleeve that is secured in a circumferential wall of the base member.

16. The trimmer head according to claim 15, wherein the outlet sleeve has a rim that engages a receptacle provided on the base member.

17. The trimmer head according to claim 1, wherein at least one lateral surface of the clamping member has a countersunk hole for reducing the weight of the clamping member.

18. The trimmer head according to claim 17, wherein the countersunk hole is a bore.

19. The trimmer head according to claim 18, wherein the bore is a penetrating bore having a bore axis that is parallel to the pivot bolt.

20. The trimmer head according to claim 1, wherein the bracket is made of metal and is made by bending a metal strip.

* * * * *